(12) United States Patent
Hergenhan et al.

(10) Patent No.: US 12,537,879 B2
(45) Date of Patent: Jan. 27, 2026

(54) METHODS, APPARATUS, AND SYSTEMS FOR DISCOVERY OF EDGE NETWORK MANAGEMENT SERVERS

(71) Applicant: InterDigital Patent Holdings, Inc., Wilmington, DE (US)

(72) Inventors: Scott Hergenhan, Collegeville, PA (US); Robert Gazda, Spring City, PA (US); Debashish Purkayastha, Collegeville, PA (US); Michel Roy, Candiac (CA); Ulises Olvera-Hernandez, Saint-Lazare (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/911,897

(22) PCT Filed: Apr. 2, 2021

(86) PCT No.: PCT/US2021/025525
§ 371 (c)(1),
(2) Date: Sep. 15, 2022

(87) PCT Pub. No.: WO2021/202966
PCT Pub. Date: Oct. 7, 2021

(65) Prior Publication Data
US 2023/0156094 A1    May 18, 2023

Related U.S. Application Data

(60) Provisional application No. 63/150,256, filed on Feb. 17, 2021, provisional application No. 63/004,710, filed on Apr. 3, 2020.

(51) Int. Cl.
*H04L 67/51* (2022.01)
*H04L 67/141* (2022.01)

(52) U.S. Cl.
CPC ............ *H04L 67/51* (2022.05); *H04L 67/141* (2013.01)

(58) Field of Classification Search
None
See application file for complete search history.

(56) References Cited

U.S. PATENT DOCUMENTS

2011/0289172 A1*  11/2011  Marcellino ............. H04L 67/55
                                                                      709/206
2020/0170003 A1*   5/2020  Kim ....................... H04L 5/0032
(Continued)

FOREIGN PATENT DOCUMENTS

CA      3030741 A1 * 10/2018  ......... H04L 63/0272
EP      2765744 A1    8/2014
(Continued)

OTHER PUBLICATIONS

3rd Generation Partnership Project (3GPP), "Mobile radio interface Layer 3 specification"; "Core network protocols"; Stage 3, Release 16, 3GPP TS 24.008 V16.3.0, Dec. 2019, Valbonne, France, 794 pages.

(Continued)

*Primary Examiner* — Lance Leonard Barry
(74) *Attorney, Agent, or Firm* — Flaster Greenberg P.C.

(57) ABSTRACT

Methods, apparatus, systems, architectures and interfaces for a wireless transmit receive unit (WTRU) performing discovery of edge computing servers are provided. A WTRU may send a request message, such as a protocol data unit (PDU) session establishment request, to the core network. The request may include (e.g., in a protocol configuration option (PCO)) information related to receiving edge data network configuration server (ECS) addresses. The WTRU may receive an acknowledgement or accept message (e.g., a PDU session establishment accept message) including (e.g., in another PCO) server information (e.g., ECS information)

(Continued)

indicating addresses, identifiers, and/or tracking area identities (TAIs) that can be served by an associated ECS. The WTRU may perform communications with one or more ECSs.

16 Claims, 16 Drawing Sheets

(56) References Cited

U.S. PATENT DOCUMENTS

| | | | | |
|---|---|---|---|---|
| 2020/0389830 | A1* | 12/2020 | Park | H04W 8/08 |
| 2022/0329649 | A1* | 10/2022 | Feng | H04L 67/1001 |
| 2022/0377046 | A1* | 11/2022 | Zhang | H04L 67/51 |
| 2023/0026671 | A1* | 1/2023 | Seed | H04W 36/32 |
| 2023/0053805 | A1* | 2/2023 | Kim | H04L 65/40 |

FOREIGN PATENT DOCUMENTS

| | | | |
|---|---|---|---|
| WO | WO-2018006017 | A1 * | 1/2018 |
| WO | WO-2019137555 | A1 * | 7/2019 |
| WO | WO 2021/041467 | A1 | 3/2021 |

OTHER PUBLICATIONS

3rd Generation Partnership Project (3GPP), "Non-Access-Stratum (NAS) protocol for 5G System (5GS)", Stage 3, Release 16, 3GPP TS 24.501 V16.3.0, Dec. 2019, Valboone, France, 645 pages.

3rd Generation Partnership Project (3GPP), "5G System; Interworking between 5G Network and external Data Networks", Stage 3, Release 16, 3GPP TS 29.561 V16.2.0, Dec. 2019, Valbonne, France, 63 pages.

3rd Generation Partnership Project (3GPP), "Solution for the KI#1: Discovery of edge application server based on DNS mechanism", S2-1911170, Huawei, HiSilicon, SA WG2 Meeting #136, Nov. 18-22, 2019, Reno, NV, 5 pages.

3rd Generation Partnership Project (3GPP), "Study on application architecture for enabling Edge Applications", Release 17, 3GPP TR 23.758 V2.0.0, Dec. 2019, Valbonne, France, 113 pages.

3rd Generation Partnership Project (3GPP), "System architecture for the 5G System (5GS)", Stage 2, Release 16, 3GPP TS 23.501 V16.3.0, Dec. 2019, Valbonne, France, 417 pages.

ETSI GS MEC 002 V2.1.1 (Oct. 2018), "Mutli-access Edge Computing (MEC); Phase 2: Use Cases and Requirements", F-06921, Sophia Antipolis, France, 66 pages.

ETSI GS MEC 003 V2.1.1 (Jan. 2019), "Mutli-access Edge Computing (MEC); Framework and Reference Architecture", F-06921, Sophia Antipolis, France, 21 pages.

ETSI website, "Muti-access Edge Computing", Strategic Relevance, Sophia Antipolis Cedex, France, 2 pages.

3rd Generation Partnership Project; "EAS discovery based on EES acting as DNS proxy", Huawei, Hisilicon, S6-200120, 3GPP TSG-SA WG6 Meeting #35, Hyderabad, India, Jan. 13-17, 2020, 7 pages.

* cited by examiner

METHODS, APPARATUS, AND SYSTEMS FOR DISCOVERY OF EDGE NETWORK MANAGEMENT SERVERS

CROSS-REFERENCE TO RELATED APPLICATIONS

This application is a 371 National Stage of International Application No. PCT/US2021/025525, filed Apr. 2, 2021, which claims priority to U.S. Provisional Patent Application No. 63/150,256, filed Feb. 17, 2021, and U.S. Provisional Patent Application No. 63/004,710, filed Apr. 3, 2020, the disclosures of which are incorporated herein by reference in their entireties.

BACKGROUND

The present invention relates to the field of computing and communications and, more particularly, to methods, apparatus, systems, architectures and interfaces for computing and communications in an advanced or next generation wireless communication system, including communications carried out using a new radio and/or new radio (NR) access technology and communication systems. Such NR access and technology, which may also be referred to as 5G, may provide edge computing, which may also be referred to as fog networking and/or ubiquitous computing, and may make edge computing a necessity. For example, use cases such as automation of vehicles, such as cars and drones, real-time Augmented Reality (AR), immersive gaming, etc. represent only a few technologically advanced use cases that may need edge computing, for example, for low latency support. Although implementation of such use cases has been attempted using conventional network capabilities and technologies, such implementations remain scarce and available with limited features, for example, in controlled environments and/or using specialized hardware.

While edge computing may have similarities with (e.g., conventional) cloud computing, edge computing has its own unique set of challenges. For example, in a case of (e.g., conventional) cloud computing networks, existing discovery and/or routing mechanisms operate assuming that services are centrally located, and such services provide equivalent performance and/or functionality. However, both assumptions are inexact in a case of edge computing because services are deployed in a de-centralized way and/or placed closer to the point of consumption. In such a case, depending on the service instance selected, such services may not provide an equivalent latency to the end-user. The European Telecommunications Standards Institute (ETSI)—Multi-access Edge Computing (MEC) and the 3$^{rd}$ Generation Partnership Project (3GPP) 5G Edge Compute group are focused on characterizing and solving such edge computing problems.

Solving such edge computing problems may include addressing Domain Name System/Service/Server (DNS) technology. DNS is an essential component of the internet as it provides a worldwide distributed name directory service and is used in both public and private networks. DNS translates fully qualified domain names (FQDN), identifying an application or service, to the IP addresses needed for locating and identifying computer resources in the IP address space, where applications and services are available.

In a case of distributed (e.g., conventional) cloud services, a function of DNS is to optimize user distribution by providing different IP addresses for the same FQDN, for example, to direct users to proximal servers for low latency. Such DNS functions are provided using DNS communications having a message structure of 5 sections: (1) Header, (2) Question (e.g., a question for the DNS), (3) Answer (e.g., resource records (RRs) answering the question), (4) Authority (e.g., RRs pointing toward an authority), and (5) Additional (e.g., RRs holding additional information). A header is always present and specifies which of the remaining sections are present. The header includes a 16-bit identifier (ID) used in both the request and the responses, a series of bits describing the message, and four counters indicating the number of records in the other sections. A question contains fields that describe a question/query sent to a name server and is composed of query type (QTYPE), query class (QCLASS) and query domain name (QNAME) fields. The Answer, Authority, and Additional sections have the same format, each being a list of RRs, each of which may be empty. Further a DNS message format, as discussed herein, may be similar to that as described and/or defined by the Internet Engineering Task Force (IETF).

Edge computing, for example, as described by 3GPP, may be considered to be a network architecture concept enabling deployment of cloud computing capabilities and service environments at edge networks, for example, of a 3GPP cellular network. Edge computing may allow for any of: lower latency, higher bandwidth, reduced backhaul traffic, and new services. Further, for example, as described by European Telecommunications Standards Institute (ETSI) Multi-access Edge Computing (MEC) industry specification group (ISG), edge computing may be considered as part of an evolution of mobile networks and convergence of IT and telecommunications/wireless networking. Multi-access Edge Computing provides consumers and enterprise customers with vertical business segments and services, and allows for software applications to access/use local content and real-time information about local-access network conditions. Further, mobile core networks are alleviated of further congestion (e.g., to efficiently serve local purposes) when services and caching content are deployed at the network edge. Additionally, edge computing may be view as needed (e.g., necessary) to enable a variety of technologically advanced use cases, such as, for example, vehicle/drone automation, real-time AR/VR, and immersive gaming.

BRIEF DESCRIPTION OF THE DRAWINGS

A more detailed understanding may be had from the following description, given by way of example in conjunction with the accompanying drawings, wherein like reference numerals in the figures indicate like elements, and wherein.

EXAMPLE NETWORKS FOR IMPLEMENTATION OF THE EMBODIMENTS

Figure 1A:
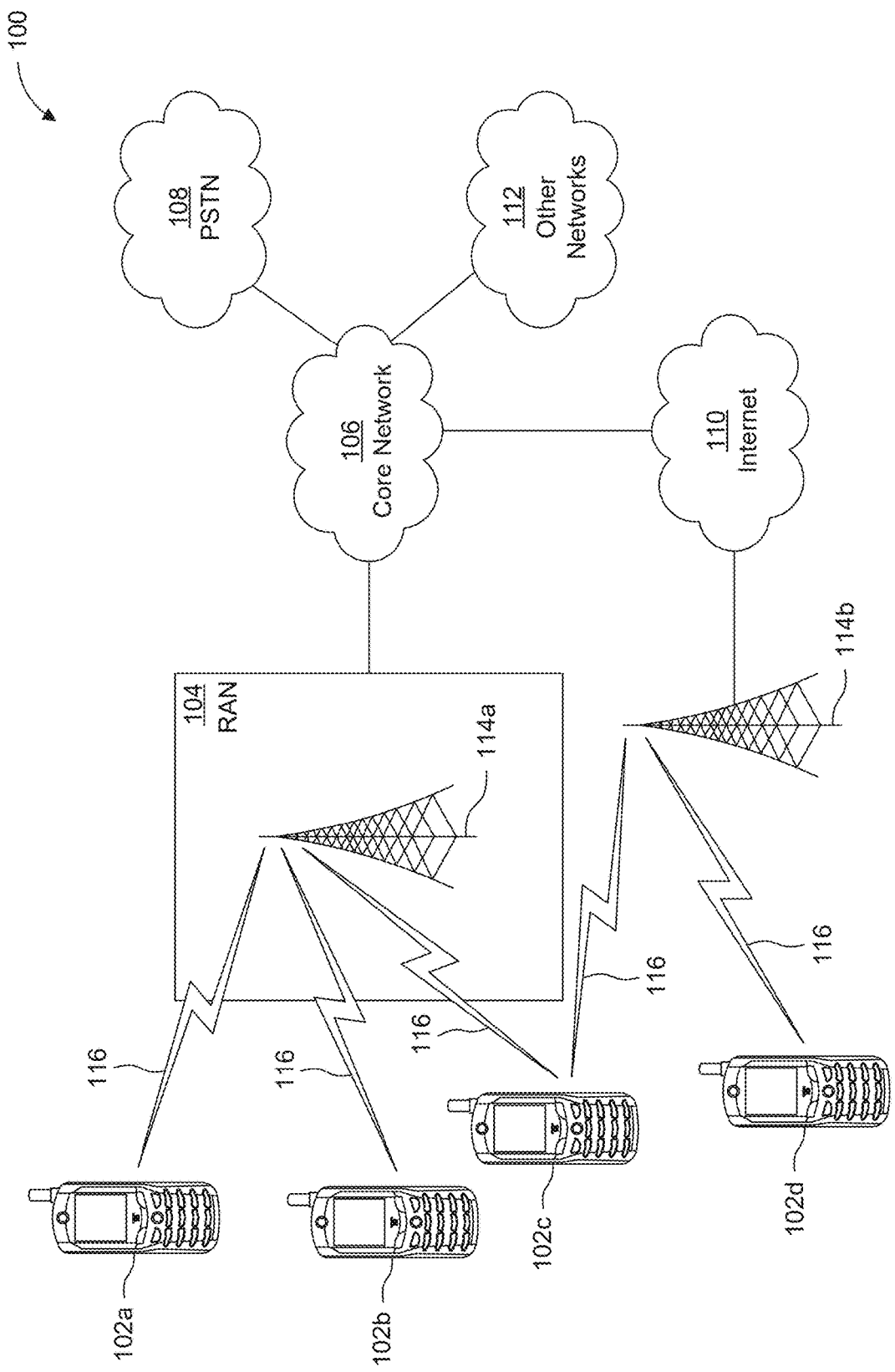
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
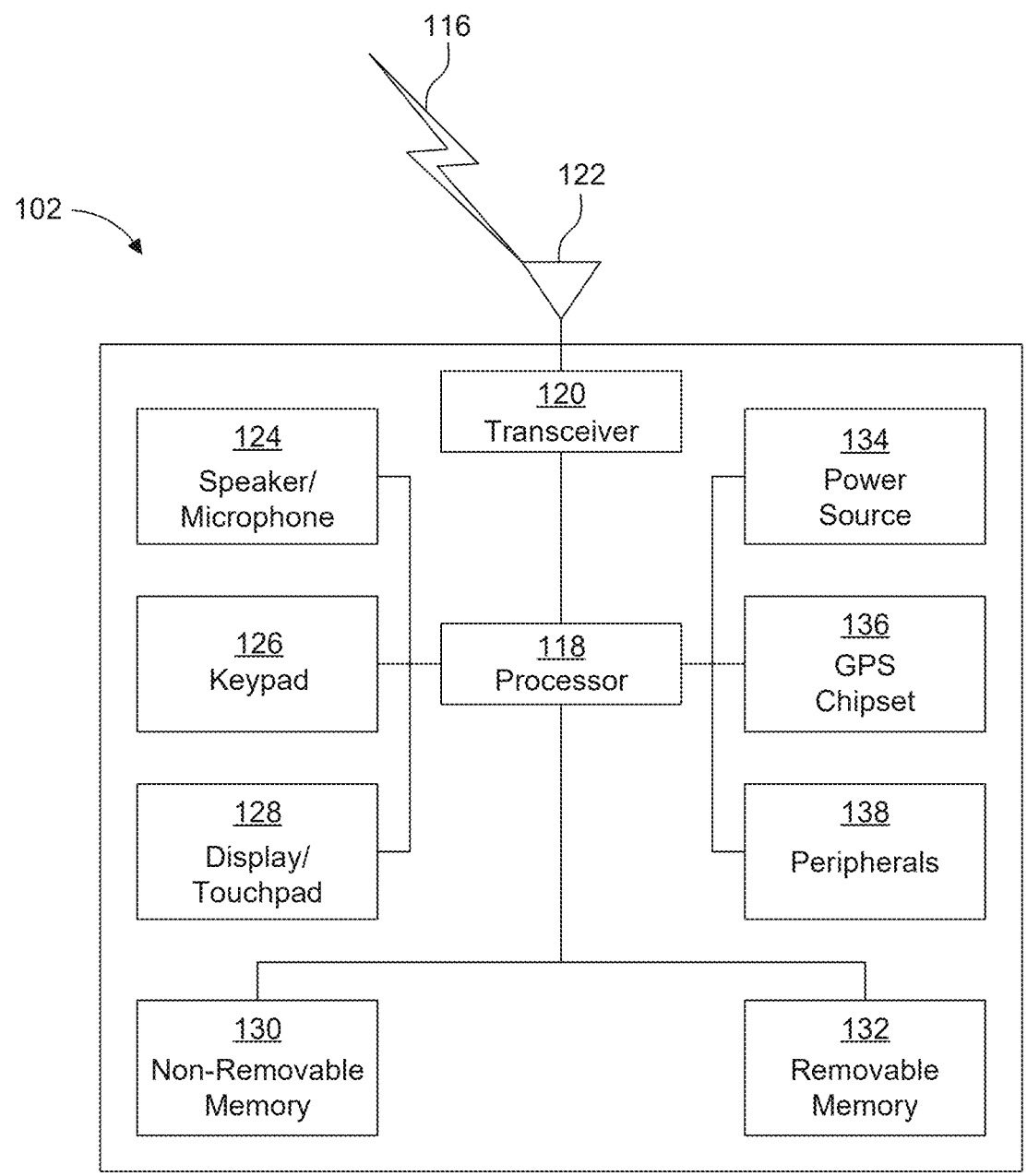
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
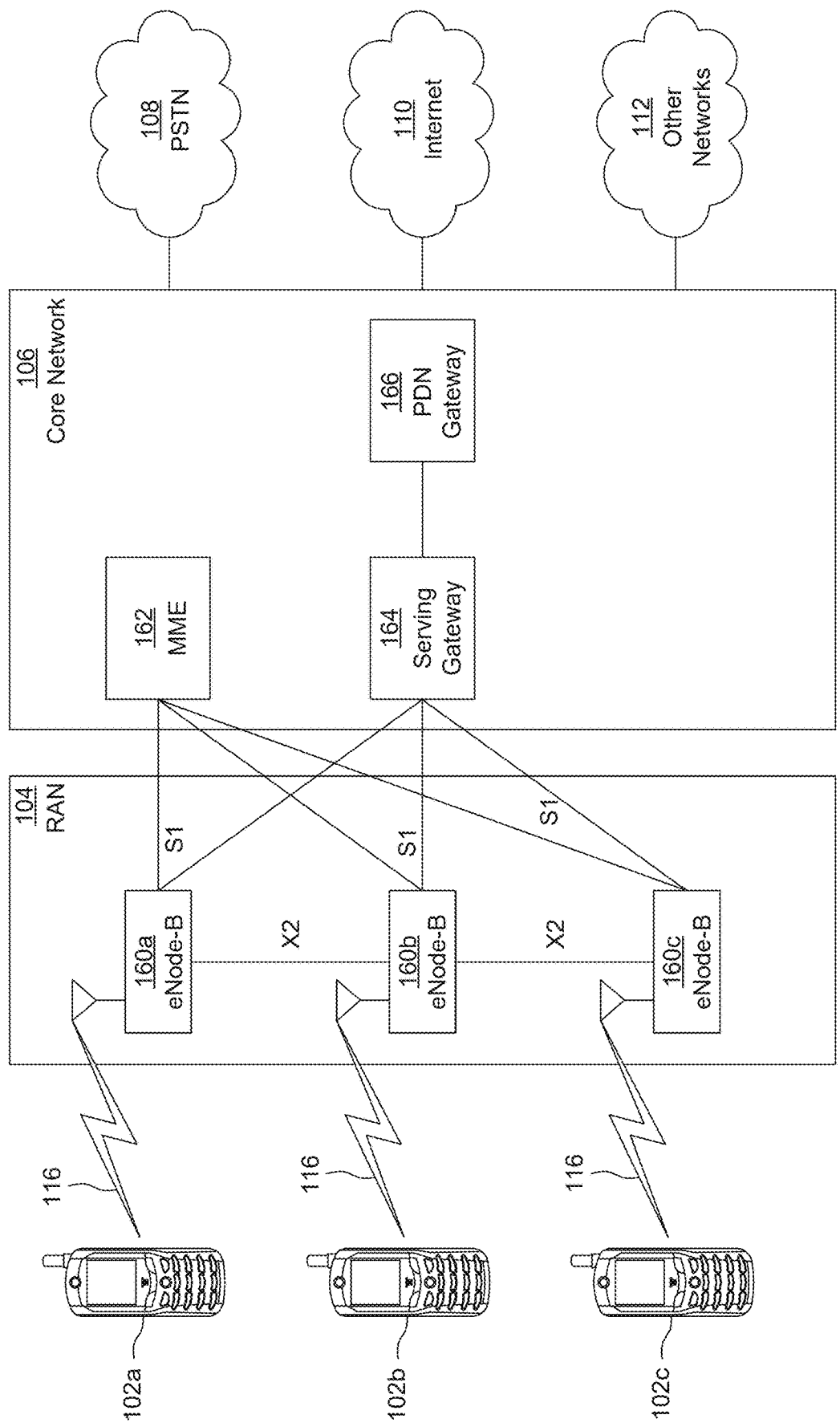
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
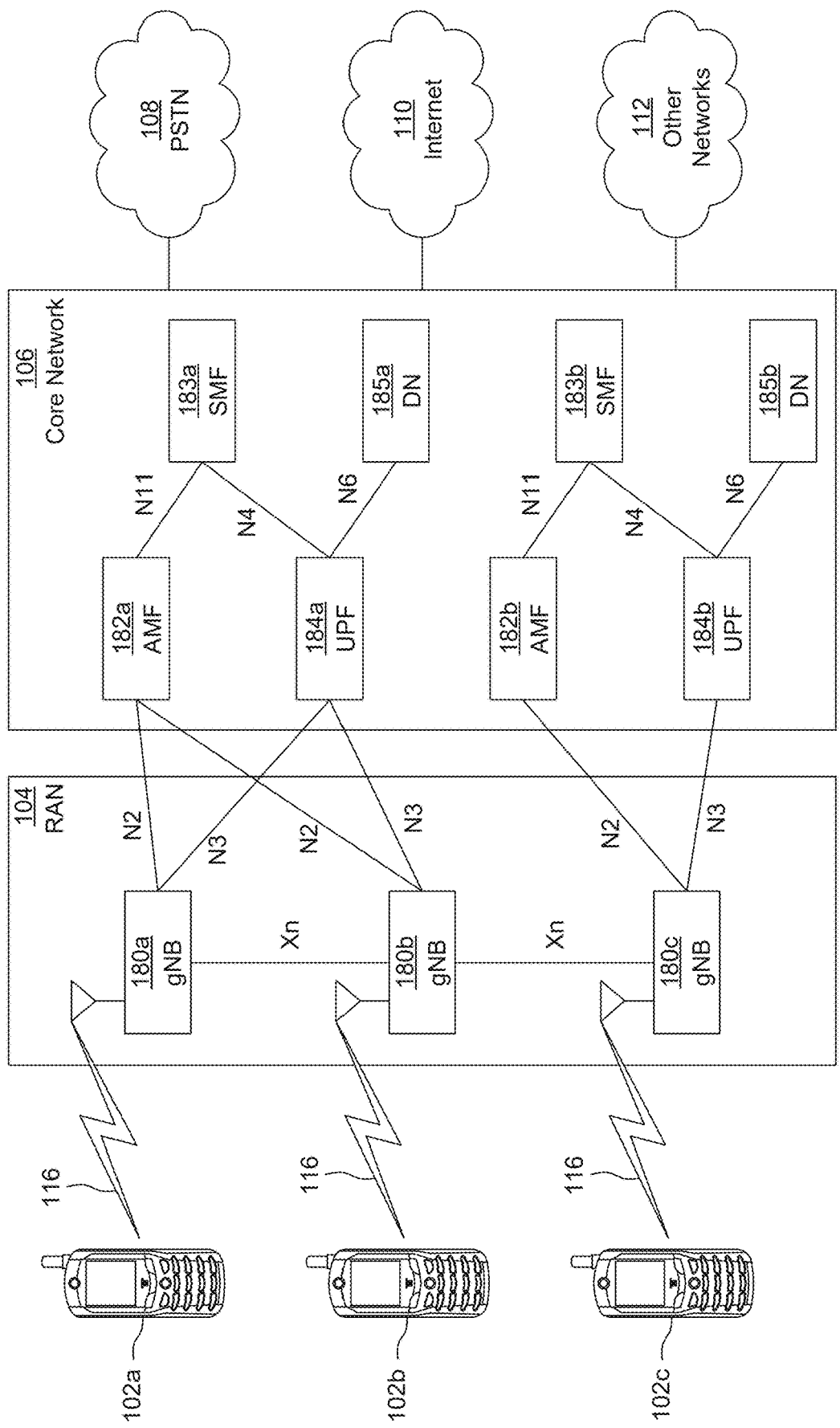
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

Introduction—DNS

In view of DNS communications having a message structure including sections for a header, a question, an answer, an authority, and additional RRs, the DNS protocol may be considered to consist of two (e.g., main) parts: (1) a query/response protocol for querying against specific names, and (2) a protocol for name servers to exchange database records.

Applications on/at the edge of wireless networks, such as 3GPP networks, may be (e.g., should be, need to be) deployed without impacting applications (e.g., edge-unaware applications), on the WTRU, that are not aware of the edge, and with minimal impact to edge-aware applications on/at the WTRU.

Figure 2:
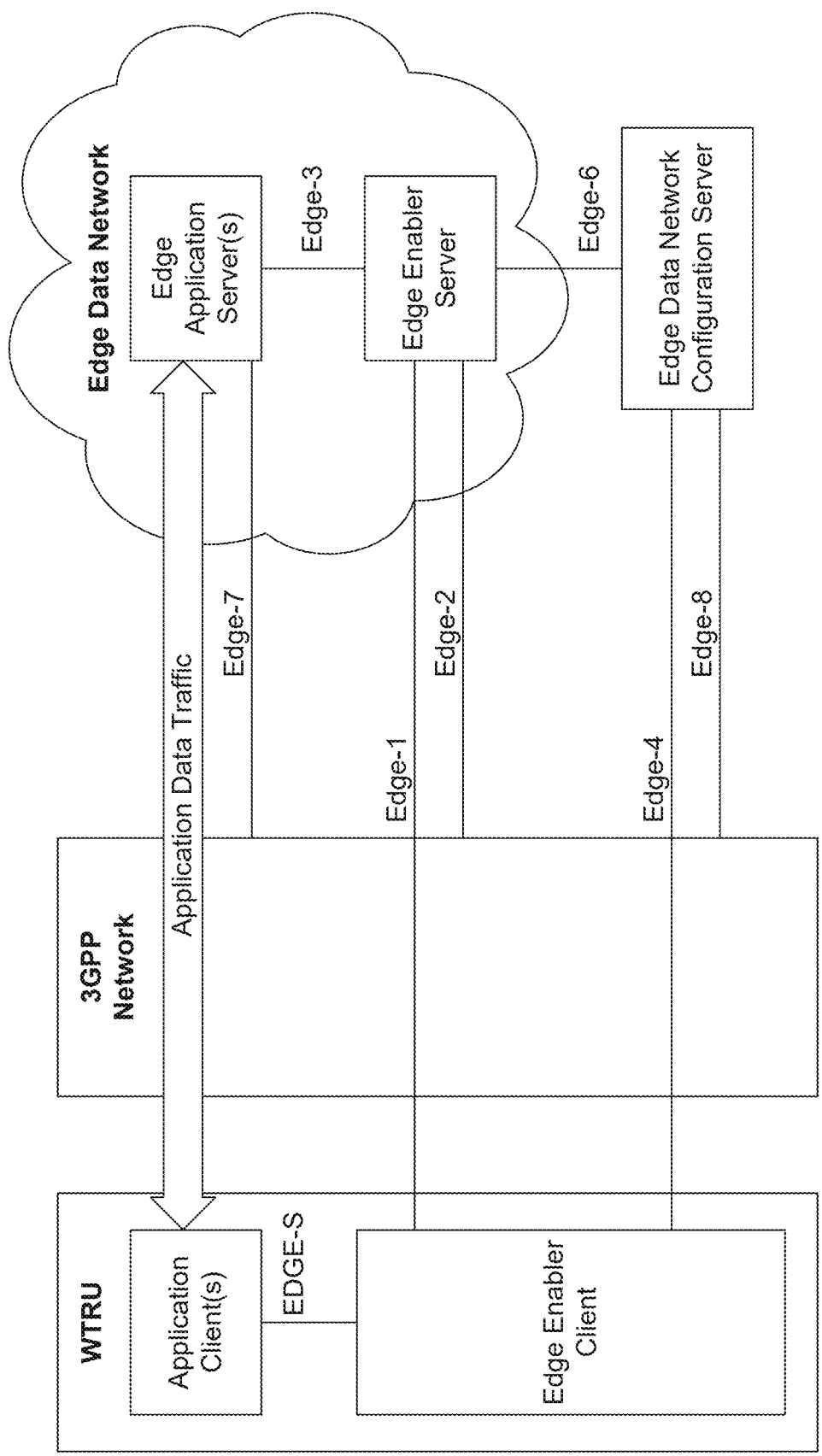
FIG. 2 is a diagram illustrating a 3GPP application architecture for enabling edge applications.

FIG. 2 is a diagram illustrating a 3GPP application architecture for enabling edge applications.

Referring to FIG. 2, and the disclosure hereinbelow, an architecture for enabling edge applications may be as described by 3GPP. An architecture 200 for enabling edge application may include a WTRU 201, including any of application client(s) 202 and an edge enabler client 203. Further, the architecture 200 may include any of a 3GPP network 204, an edge data network 205, including any of edge application servers 206 and an edge enabler server 207, and an edge data network configuration server 208. An edge enabler server 207 provides functions needed for edge application servers 206 to run in the edge data network 205. Such functions include providing information about edge application servers 206 to the edge enabler client 203, along with providing any configuration information needed to communicate with the servers 206. The edge enabler client 203 provides functions for application client(s) 202 running on a WTRU, to make use of the edge application servers 206. That is, the edge enabler client 203 communicates with edge enabler servers 207 to discover and retrieve information about edge application servers 206.

The EDGE-1 reference point between an edge enabler client 203 and an edge enabler server 207 is the entry point for devices (e.g., WTRUs, BSs, nodes, servers, etc.) into the edge network management system. A (e.g., conventional) mechanism of finding an edge enabler server, such as server 207, for example, as suggested by 3GPP, is using a combination of pre-configuration and DNS. That is, 3GPP proposes that a service provider deploy a global/regional edge data network configuration server, such as server 208, from which an edge enabler client, such as client 203, requests information for establishing a connection with the edge enabler server. The edge enabler client (e.g., client 203) is (e.g., must have been) configured with an address/URI of the edge data network configuration server (e.g., server 208). Such address/URI is pre-configured in a WTRU or is a pre-defined value derived from a serving network domain name.

Figure 3:
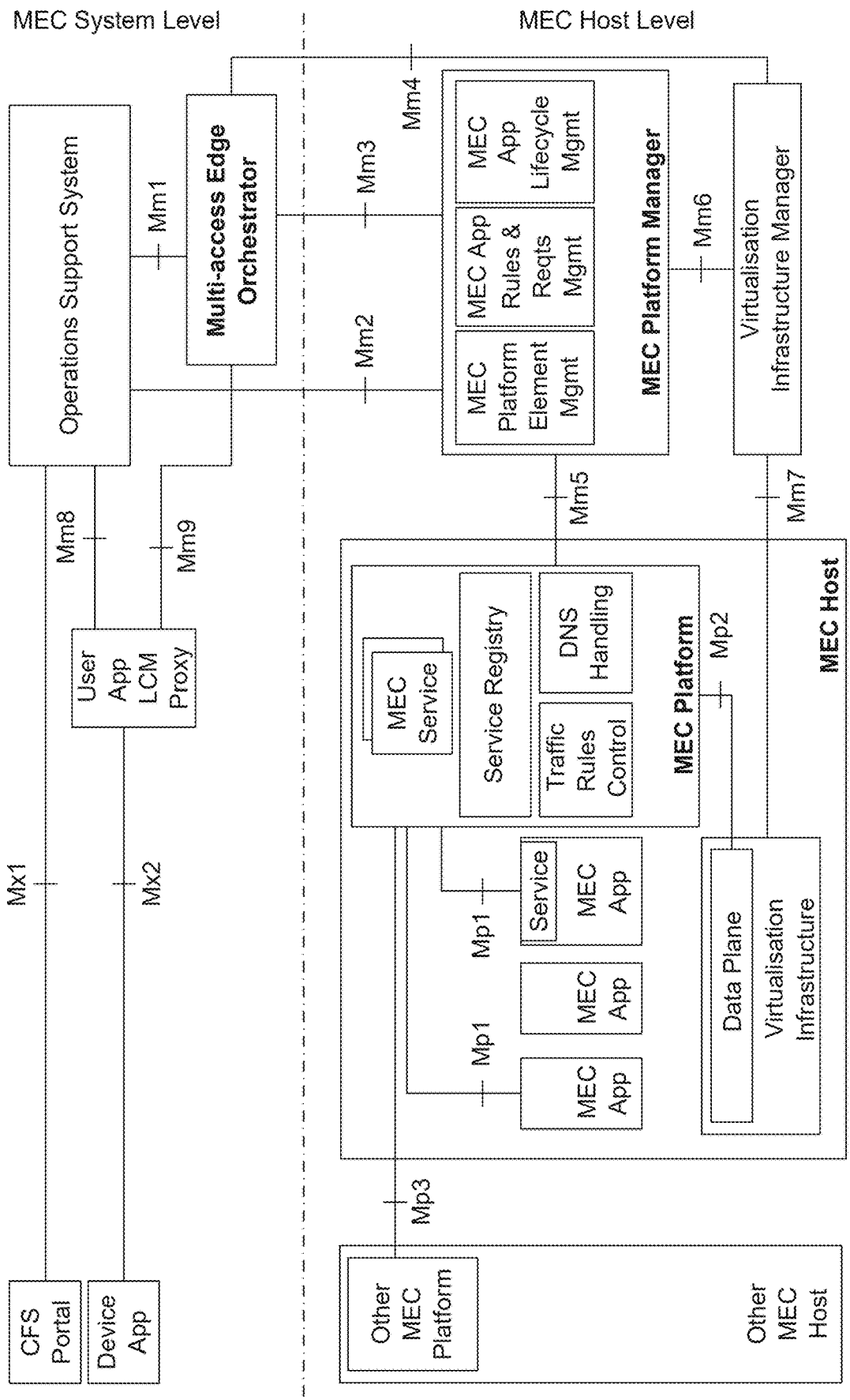
FIG. 3 is a diagram illustrating an ETSI-MEC reference architecture (e.g., framework)

FIG. 3 is a diagram illustrating an ETSI-MEC reference architecture (e.g., framework).

Referring to FIG. 3, an ETSI MEC framework, such as multi-access edge system 300, enables implementation of MEC applications 301 as software-only entities that run on top of a virtualization infrastructure, which is located in, or close to, a network edge. ETSI MEC defines a reference architecture, identifying functional elements of a MEC system and reference points between the functional elements. The multi-access edge system 300 includes MEC host(s) and MEC management (e.g., necessary) to run MEC applications within an operator network or a subset of an operator network. MEC management includes MEC system level management and the MEC host level management. The MEC system level management includes a multi-access edge orchestrator (MEO) 302 as a (e.g., core) component having an overview of the (e.g., complete) MEC system. Such overview may include, for example, the network topology, the deployed MEC hosts, and available resources and services. The MEO 302 is responsible for on-boarding, placement, instantiation, termination, and relocation of applications.

An operations support system (OSS) 303 is (e.g., refers to) an OSS of an operator. The OSS 303 receives requests for application operations (e.g., instantiation, termination, and relocation), and decides whether to grant such requests. Granted requests are forwarded to the MEO 302 for further processing. A User Application 301 is a MEC application that is instantiated in the MEC system 300 in response to a request of a user via a device application. A user application lifecycle management proxy (UALCMP) allows device applications to request on-boarding, instantiation, termination, and relocation of user applications, and allows for the device applications to be informed about the state of the user applications. The UALCMP authorizes requests from device applications in the device (e.g. WTRU, laptop with internet connectivity, tablet, etc.) and interacts with the OSS and MEO for further processing of these requests. A Mx2 reference point between a device application and a UAL-CMP is the entry point for devices into the edge network management system. Furthermore, ETSI MEC does not explicitly state how to find a UALCMP. However, it is (e.g., commonly) assumed that the UALCMP will reside at a well-known FQDN, which, (e.g., similar as in 3GPP) this amounts to a combination of pre-configuration and DNS.

DHCP, for example in the case of IPv4 networking, enables devices to join a network, and to begin communicating within and beyond said network. DHCPv6 is the equivalent protocol for IPv6. Both DHCP and DHCPv6 employ the use of options to carry additional parameters in protocol messages. Such options are used in both directions, that is in client-to-server and server-to-client directions. A client may use such options to provide information about itself, and suggestions or hints at configuration parameters desired (e.g., by the client) from the server. A (e.g., DHCP, DHCPv6) server may use options to provide information about the network, and configuration values for the client. A DHCP inform message enables the exchange of DHCP options without the allocation of a client IP address, thus extending the DHCP option mechanism to clients whose address is configured via other means. Such features are continued in DHCPv6, which can operate either in alternative to, or in addition to, stateless address autoconfiguration (SLAAC).

In a case of a 3GPP network having/using DHCP, an IP address is assigned, and network configuration parameters (e.g. DNS server addresses) are provided to a WTRU, for example, during a protocol data unit (PDU) session establishment. In such a case, a WTRU may (e.g., has the option to) obtain an IP address via NAS signaling or via DHCP, for example, after the PDU session establishment. Further, a WTRU may (e.g., has the option to, independently determine to) obtain network parameters via NAS signaling or via DHCP, for example, in the case of IPv4 and IPv6. For example, in a case of a 3GPP network (i.e., and/or any similar wireless network), for such to support DHCP-based IP address configuration, a session management function (SMF) acts as a DHCP server towards (e.g., for) a WTRU.

Further, in such a case, an external data network may be used to obtain an IP address and network parameters, and in such a case, the SMF acts as the DHCP client towards the external DHCP server. In such a case, NAS signaling may be used, and there are "extended protocol configuration options" defined for the PDU Session messages, and such option definitions may refer (e.g., back to) the "protocol configuration options" (PCOs) defined for PDP context messages. In such a case, there may be local server discovery, an example of which is included in the IP Multimedia Subsystem (IMS) Interworking Model as described according to 3GPP documents. In such a case, addresses of Proxy Call Session Control Function (P-CSCF) servers are provided to a WTRU via either DHCP Options or PDU Session PCO. Further, in such case of the 3GPP network, the P-CSCF IP addresses may be locally configured in the SMF or discovered using a network repository function (NRF).

Discovery of Edge Network Management Servers

In an edge computing environment, an edge-aware application (e.g., device) attempting to join an edge network, and to discover and make use of edge network services, can (e.g., must first) discover an edge network management server.

That is, in an edge computing environment, for example, in the case of architectures shown in FIGS. 2 and 3, and/or in the case of 3GPP architecture, the Edge Enabler Client must find the address(es) of the edge enabler server(s) and/or edge data network configuration server(s); and in the case of ETSI MEC architecture, the device application must find the address of the UALCMP.

An edge network is (e.g., by definition) localized and specific with respect to any of topology, capabilities, and configuration. However, edge computing can (e.g., is expected to) be deployed globally across many mobile network service providers, cable providers, tower companies, neutral hosts, and infrastructure vendor platforms. In such a case, conventional (e.g., current, state-of-the-art) mechanisms for discovery of edge network management servers need (e.g., require): (1) some amount of pre-configuration, and (2) DNS, which cannot be used reliably in edge networks. That is, DNS cannot be used reliably, for any of the following reasons: (i) DNS caching prevents a client from making consistent use of edge network DNS servers; (ii) flushing the cache to force full DNS resolution is prohibitively inefficient and slow; and (iii) networks do not support using TTL-zero for DNS entries.

According to embodiments, that is, in view of the above noted (e.g., conventional) mechanisms for discovery of edge network management servers, there is a need to determine how an edge-aware application/device discovers and locates an edge network management server, for example, in a case of no pre-configuration and/or no previous association with an edge network. According to embodiments, for example, for universal applicability, a mechanism (e.g., procedure, features, operations, methods, etc.) for discovery (e.g., of edge network management servers) may (e.g., should, needs to, must) perform and/or satisfy any of the following: (1) not require any of pre-configuration or prior association with a (e.g., specific) edge network provider in an application/device; (2) have minimal impact on edge-aware devices, and no impact on edge-unaware devices; (3) be suitable for networks of varying size and complexity; and (4) provide multiple addresses to support multiple edge network management servers and/or multiple edge network management systems.

ECS Provisioning for WTRUs with Multiple EECs

Further to a case of (e.g., in addition to) the issues discussed above, for example, in a case of architectures and/or features specified by 3GPP (see, for example, 3GPP documents regarding edge applications), such may address the provision of ECS configuration information (e.g., through 5GC procedures). However, in such a case (e.g., as specified by 3GPP), it is not clear how such address a case where more than one EEC is supported in the (e.g., by the) WTRU, and, in such a case, these EECs may be connected to one or more application clients (ACs). In such a case there may be a need to determine how the SMF may/can provision ECS information to the correct EEC when more than one EEC and more than one AC is supported in/by a WTRU.

According to embodiments, DHCP may be used to discover entry points to (e.g., access into, paths to, interfaces for, accessing, etc.) edge network management servers. According to embodiments, a DHCP Option for edge network management (ENM) servers may satisfy (e.g., all) requirements of the discovery mechanism discussed above, and additionally, may provide any of the following noted benefits. According to embodiments, a benefit may be that, regardless of a size of a network, DHCP servers may prioritize and/or filter ENM Server candidates, for example, based on a location (e.g., an attachment point) of a client.

For example, either (a) the DHCP server is localized to said attachment point, or (b) the DHCP server is centralized, and DHCP relay agents are used, which may provide the necessary information.

According to embodiments, (e.g., a benefit may be that) information associated with any of requirements for, and/or availability of, edge network services may be communicated (e.g., signaled, transmitted, sent, etc.) between DHCP clients and servers. According to embodiments, such communicated requirements may be used by any of a client or a server, for example, to further prioritize/filter ENM server candidates. According to embodiments, in a case where there is a change in/of requirements for, and/or availability of, edge network services, rediscovery may be triggered. According to embodiments, another benefit may be that a solution (e.g., a resolved FQDN) may be kept local and may be (e.g., easily) managed at the edge network level. According to embodiments, a global and/or regional configuration server, for example, having (e.g., including, containing, storing, etc.) information associated with (e.g., spanning) many edge networks may be not needed.

Client Discovery of ENM Servers

Figure 4:
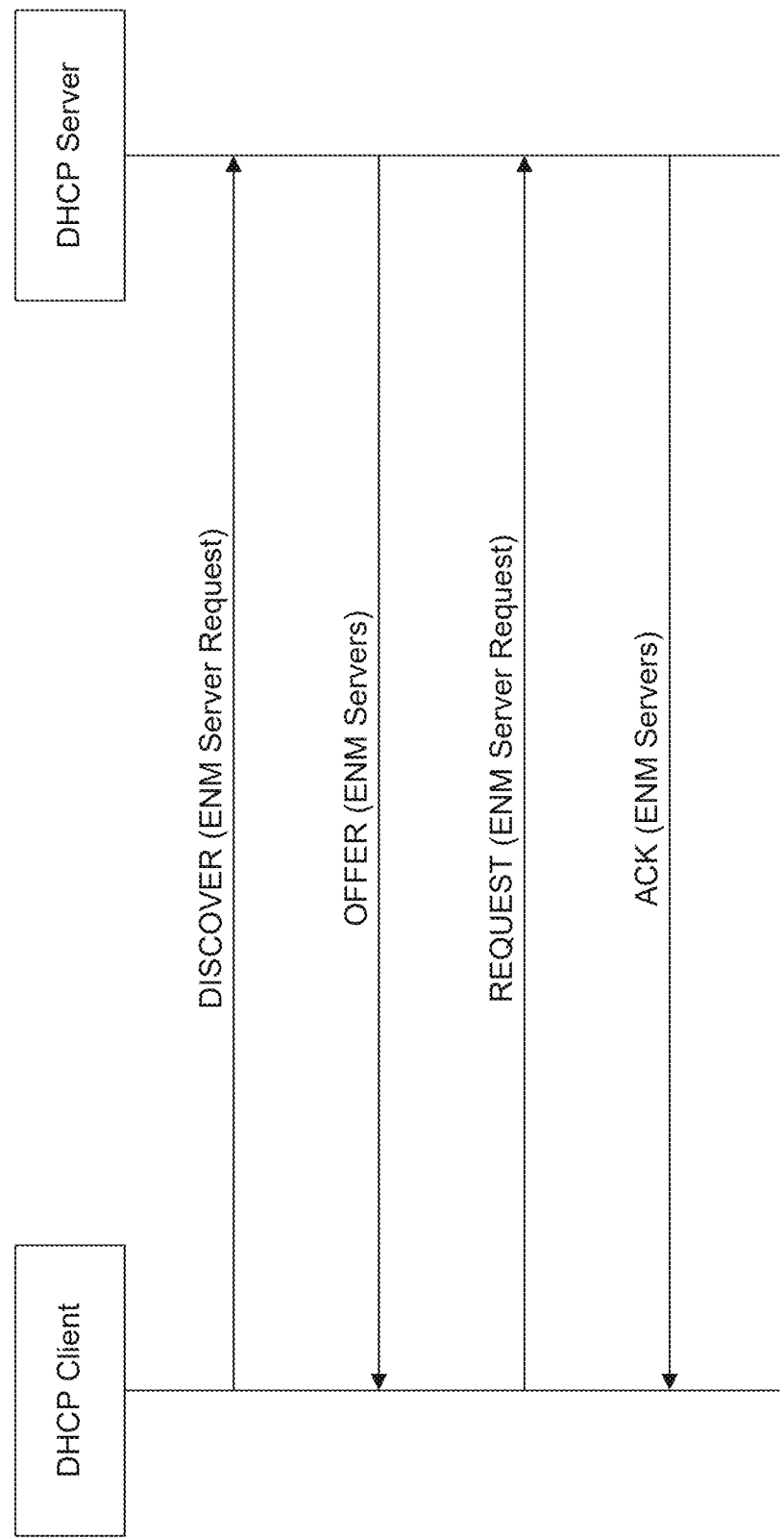
FIG. 4 is a diagram illustrating Client Discovery of ENM servers with address assignment, according to embodiments.

FIG. 4 is a diagram illustrating Client Discovery of ENM servers with address assignment, according to embodiments.

According to embodiments, a client discovery of ENM servers with address assignment may be performed as described below, with reference to FIG. 4. According to embodiments, a parameter request list, which is a (e.g., existing) DHCP option, may be used by a client to request values for specified configuration parameters, and the list may be specified as n octets, where each octet is a valid DHCP option code. According to embodiments, a client using DHCP for IP address assignment, and wishing to discover ENM Servers, may add a code for a new ENM Server DHCP Option to a parameter request list, for example, in any of a DISCOVER message and a (e.g., subsequent) REQUEST message. According to embodiments, a DHCP server, (e.g., in response to the parameter request list) may include an actual ENM Server DHCP Option (e.g., containing ENM Server information) in any of the OFFER and ACK messages.

According to embodiments, integration between a DHCP client and a server may be illustrated in FIG. 4, with the new ENM server options appended to existing DHCP messages. According to embodiments, such a convention of appending information to existing DHCP messages may be used throughout this document. According to embodiments, new parameters may be listed in message flows, and existing parameters may be omitted. According to embodiments, a format of an ENM server DHCP option may be similar to conventional (e.g., standardized) formats, for example, used for DNS, NTP, and SMTP servers, and may be as follows:

This option specifies a list of IP addresses indicating ENM Servers available to the client. Servers SHOULD be listed in order of preference.
The code for this option is X. The minimum length is 4, and the length MUST be a multiple of 4.

```
Code    Len      Address 1                    Address 2
+-----+-----+-----+-----+-----+-----+-----+-----+-----+-----+---
|  X  |  n  | a1  | a2  | a3  | a4  | a1  | a2  | a3  | a4  |...
+-----+-----+-----+-----+-----+-----+-----+-----+-----+-----+---
```

According to embodiments, in a similar manner as DCHP, a format for DHCPv6 may be as follows:

The ENM Server option provides a list of one or more IPv6 addresses of ENM Servers available to the client. The ENM Servers are listed in the order of preference for use by the client.

```
     0                   1                   2                   3
     0 1 2 3 4 5 6 7 8 9 0 1 2 3 4 5 6 7 8 9 0 1 2 3 4 5 6 7 8 9 0 1
    +-+-+-+-+-+-+-+-+-+-+-+-+-+-+-+-+-+-+-+-+-+-+-+-+-+-+-+-+-+-+-+-+
    |      OPTION_ENM_SERVERS       |         option-len            |
    +-+-+-+-+-+-+-+-+-+-+-+-+-+-+-+-+-+-+-+-+-+-+-+-+-+-+-+-+-+-+-+-+
    |                                                               |
    |                    ENM-server (IPv6 address)                  |
    |                                                               |
    |                                                               |
    +-+-+-+-+-+-+-+-+-+-+-+-+-+-+-+-+-+-+-+-+-+-+-+-+-+-+-+-+-+-+-+-+
    |                                                               |
    |                    ENM-server (IPv6 address)                  |
    |                                                               |
    |                                                               |
    +-+-+-+-+-+-+-+-+-+-+-+-+-+-+-+-+-+-+-+-+-+-+-+-+-+-+-+-+-+-+-+-+
    |                             ...                               |
    +-+-+-+-+-+-+-+-+-+-+-+-+-+-+-+-+-+-+-+-+-+-+-+-+-+-+-+-+-+-+-+-+
``` option-code:        OPTION_ENM_SERVERS (X)
option-len:         Length of the list of ENM Servers in octets;
                    must be a multiple of 16
ENM-server:         IPv6 address of ENM server FIG. 5 is a diagram illustrating client discovery of ENM servers without IP address assignment, according to embodiments.

According to embodiments, (e.g., as with similar DHCP options), in a case where a DHCP server does not understand an ENM Server option code, the DHCP server may (e.g., should, will) not return the ENM Server option. According to embodiments, in a case where a DHCP server understands the ENM Server option code, but is not (e.g., serving as) an edge network, the DHCP may return an empty list of ENM servers. It is noted that conventional (e.g., standard, contemporary, prior-art, etc.) DHCP servers are manually configured by administrators, either directly or indirectly, via management platforms. According to embodiments, it may be (e.g., expected) that configuration of a DHCP Server with ENM Server addresses, and any related information discussed herein, to be done using state-of-the-art techniques, as they evolve.

Figure 5:
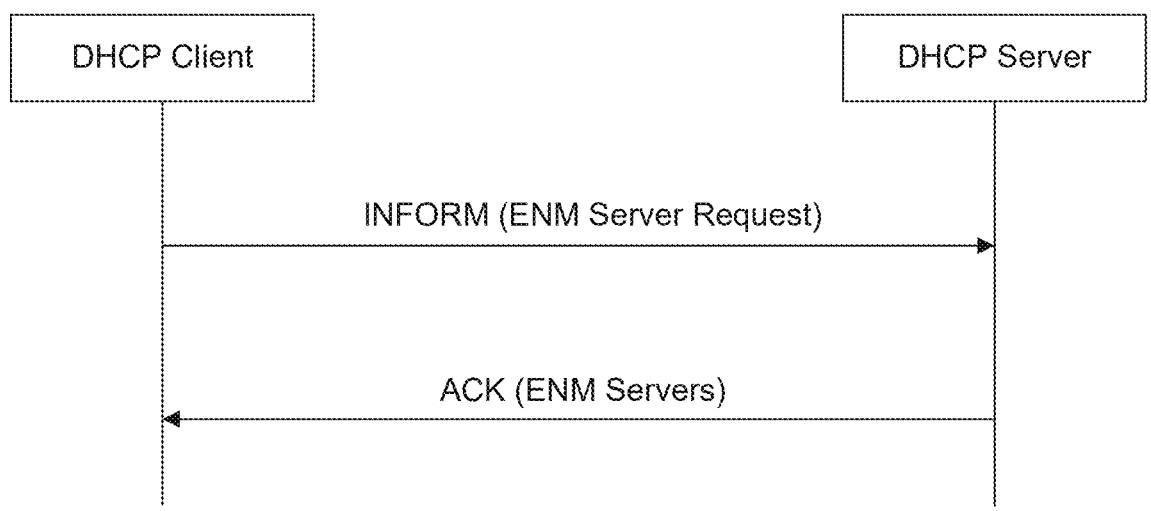
FIG. 5 is a diagram illustrating client discovery of ENM servers without IP address assignment, according to embodiments.

According to embodiments, referring to FIG. 5, a client with an IP address configured by other means, but wishing to discover ENM Servers, may add a code for the ENM Server DHCP option to a parameter request list, for example, in an INFORM message. According to embodiments, the DHCP server, may (e.g., in response) include the ENM Server DHCP option, for example, in an ACK message.

DHCP Servers Prioritizing ENM Servers

According to embodiments, a DHCP server may (e.g., is free to) apply prioritization to the ENM Server list, for example, as it sees fit, such as. based on any of performance measures, operator preferentiality, load balancing, etc. According to embodiments, as noted above, the DHCP server may communicate prioritization to the client, for example, using the list order in the ENM Server DHCP option. According to embodiments, in a case of a DHCP relay agent (e.g., being used), the DHCP relay agent may be configured with an IP address on the subnet it serves. According to embodiments, the DHCP relay agent may add this IP address to the messages it relays to the DHCP server. According to embodiments, the DHCP server may use this field (e.g. that is in the relayed messages), for example, to determine whether it should broadcast its response or unicast it back to the relay agent.

According to embodiments, the DHCP server may (e.g., further) use the DHCP relay agent address to customize a configuration sent to the client. For example, in a case where multiple ENM Servers are present, the DHCP server may prioritize (e.g., customize a configuration) based on proximity to a client. According to embodiments, for example, there may be a case of a campus network serviced by a (e.g., single) DHCP server. In such a case, the network may have two (e.g., or more, main) attachment zones (e.g., areas), each attachment zone having a respective DHCP relay agent. In such a case, there may be edge network providers (e.g., that are contracted to) enable (e.g., edge, fog, etc.) services in the campus network. For example, in such a case, edge network providers P1 and P2 may provide (e.g., enable) services throughout the campus network, however, for example, due to deployment constraints, most of P1's resources are in an east zone, and most of P2's resources are in a west zone.

According to embodiments, in such a case, a DHCP server may prioritize a P1 ENM server for clients attaching in the east zone, and a P2 ENM Server for clients in a west zone. However, the disclosure is not limited thereto, and a DHCP may prioritize ENM servers for any of a variety of reasons, factors, characteristics, requirements, etc., in addition and/or in replacement of a location of an ENM server. For example, in the case of the campus network, there may be a further case where (e.g., certain) services are provided by P1 in the west zone having a higher QoS than such services provided by P2, and a DHCP server may prioritize ENM servers accordingly.

DHCP Servers Filtering ENM Servers

According to embodiments, in a case where a client device may (e.g., desires, needs, wishes, determines, etc., to) make use of edge computing, the client device may (e.g., likely will) be doing so for a (e.g., specific) reason, such as for example, the desired applications and services, spanning both the device and the edge network, are known. In such a case, the client device may assist the DHCP server to filter the available ENM Servers. According to embodiments, a DHCP client may add (e.g., new) ENM server requirements DHCP option(s) to its messages. According to embodiments, an ENM server requirements DHCP option may be a list of identifiers, for example, for any of services and/or (e.g., associated) applications the client expects the edge network environment to provide. According to embodiments, for example, in ETSI MEC terminology, such may be feature dependencies, and in 3GPP, such may be the exposed network exposure function or service capability exposure function (NEF/SCEF) categories. According to embodiments (e.g., in addition to such categories), a WTRU (e.g., a client, a DHCP client) may use information associated with (e.g., from) traffic descriptor rules, for example, as provided by (e.g., from) a UE (e.g., WTRU) route selection policy (URSP) provided by the network. According to embodiments, such traffic descriptor related information may be associated with applications, such as, for example, information indicating an application descriptor identifying an application (e.g., an Application ID), for example, included in the ENM server requirements DHCP option, and/or associated with any of IP information or non-IP information.

According to embodiments, there may be a variety of use cases having a client device assist a DHCP server, for example, by using any of the above described client device features, such as providing (e.g., adding, sending, transmitting, etc.; new) an ENM server requirements DHCP option in messages transmitted by the client device. According to embodiments, such use cases may include any of: application computation offloading; augmented reality; and active device location tracking.

According to embodiments, in the case of application computation offloading, a network may execute certain (e.g., compute-intensive) operations, processes, functions, etc. For example, instead of a users mobile devices, a network may perform any of graphical rendering or data processing according to a DHCP server receiving an ENM server requirements DHCP option in messages transmitted by the client device. According to embodiments, in such a case, a feature dependency may be "User Apps", or any other suitable signal, field, information, or indicator of a client device having (e.g., preferring, requesting, etc.) a network execute certain operations, processes, functions, etc. For example, in an case of a client device being a smartphone used as a VR headset/screen, an ENM server requirements DHCP option may indicate a preference/request for image/motion rendering being offloaded via the network, for example, to any of home devices or other devices.

According to embodiments, in the case of augmented reality, a client device (e.g., that may send a discover message to a DHCP server) may be (e.g., involved in) providing an interactive experience, wherein objects (e.g., residing) in the real world are enhanced by computer-generated perceptual information. In such a case, as users (e.g., client devices) move around, connectivity must be maintained, and server instances (e.g., as selected by a DHCP server) may be relocated (e.g., reconfigured, rediscovered, reselected, filtered, etc.), for example, to satisfy performance requirements (e.g., as indicated/requested by the client device). Such change of ENM server instances may be referred to as smart relocation. According to embodiments, in such a case of augmented reality, a feature dependency may be "User Apps" and "Smart Relocation", or any other suitable signal, field, information, or indicator of a client device having (e.g., preferring, requesting, etc.) a network move/relocation EMN server instances that execute certain operations, processes, functions, etc.

According to embodiments, a case of active device location tracking may enable (e.g., real-time, network measurement-based) tracking of active terminals. According to embodiments, in a case of active device location tracking may enable location-based services in any of venues, retail locations, and areas where GPS coverage is not available. For example, such services may include any of mobile advertising, crowd management, and the Smart City. According to embodiments, in such a case of active device location tracking, a feature dependency may be "User Apps" and "Location", or any other suitable signal, field, information, or indicator of a client device having (e.g., preferring, requesting, etc.) a network provide services (e.g., via EMN server instances) according to a location of the client device. For example, a client device may indicate to a DHCP server (e.g., by transmitting a message including any of feature dependencies "User Apps" and "Location") that an application/service indicating parking space availability is to be executed using ENM server instances associated with any of a plurality of locations of parking garages.

According to embodiments, a format of an ENM server requirements DHCP option may be as follows:

According to embodiments, (e.g., it may be appropriate for) less stringent filters may be applied at the DHCP server, and, for example, such may allow the client to make a better-informed decision between ENM Servers. According to embodiments, there may be a case where a client may require some services, but others may be optional (e.g., preferred, would be nice to have, etc.). In such a case, the client may begin discovery using its minimum service set, and then gradually increase it.

According to embodiments, for example, for a more efficient exchange, a DHCP server may add requirement compliance information, for example, for each ENM Server, in a (e.g., new) ENM servers with requirements compliance DHCP option. According to embodiments, such features of a DHCP server adding requirement compliance information, or any other features of a DHCP server discussed herein, may be performed with respect to any of the use cases (1) application computation offloading, (2) active device location tracking, and (3) augmented reality. According to embodiments, for example, in the case of application computation offloading, a WTRU (e.g., a DHCP client device) may (e.g., be able to) perform (e.g., all of) an application's compute tasks, but may (e.g., should, would, etc.) use offloading, for example, if available. According to embodiments, in such a case, the feature dependency "User Apps" may be considered optional by any of a DHCP client or DHCP server (e.g., is not required, is nice-to-have, may be variably/conditionally provided, etc.). For example, in such a case, while a WTRU performs application computing, a battery/power supply of the WTRU may decrease, and offloading may become more important, changing the feature dependency to a requirement, e.g., rather than optional. That is, according to embodiments, feature dependencies may change, for example, for any of a variety of reasons,

```
       This option specifies a list of edge application/service identifiers
     required by the client. Each identifier is expressed as a 32-bit integer.
                       At most, 32 identifiers may be listed.
      The code for this option is Y. The minimum length is 4, the maximum
                length is 128, and the length MUST be a multiple of 4.

Code   Len        Identifier 1              Identifier 2
+-----+-----+-----+-----+-----+-----+-----+-----+-----+-----+-----
|  Y  |  n  | i1  | i2  | i3  | i4  | i1  | i2  | i3  | i4  | ...
+-----+-----+-----+-----+-----+-----+-----+-----+-----+-----+-----
```

Figure 6:
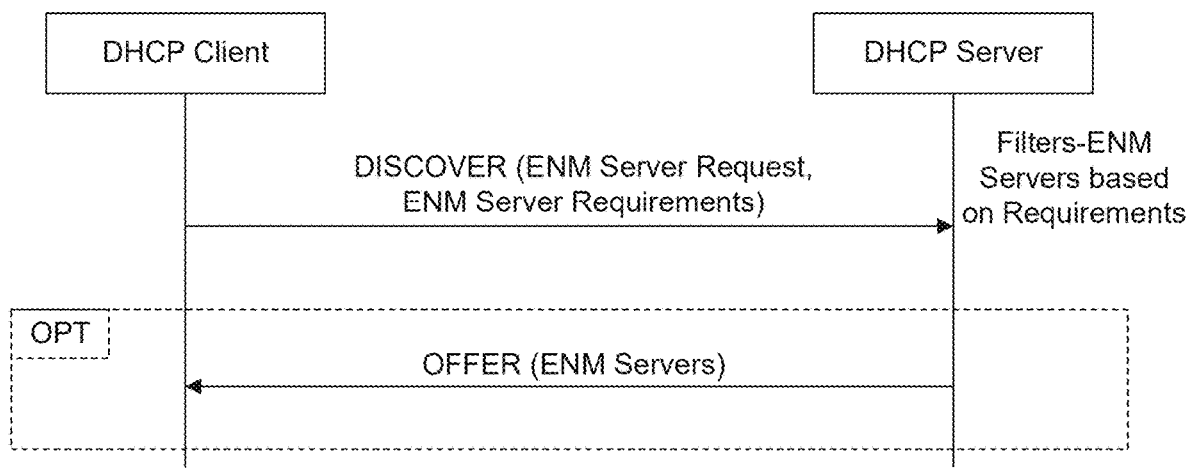
FIG. 6 is a diagram illustrating a DHCP server filtering ENM servers based on requirements, according to embodiments.

FIG. 6 is a diagram illustrating a DHCP server filtering ENM servers based on requirements, according to embodiments.

According to embodiments, in a case where a DHCP server is not able to meet a client's requirements with any available ENM Servers, the DHCP server may return a list of ENM Servers that may be empty. According to embodiments, (e.g., on the other hand), in a case where the client message is a DISCOVER message, the DHCP server may (e.g., determine, chose, opt, etc.) not to respond (e.g., at all).

Client Selecting ENM Server

Figure 7:
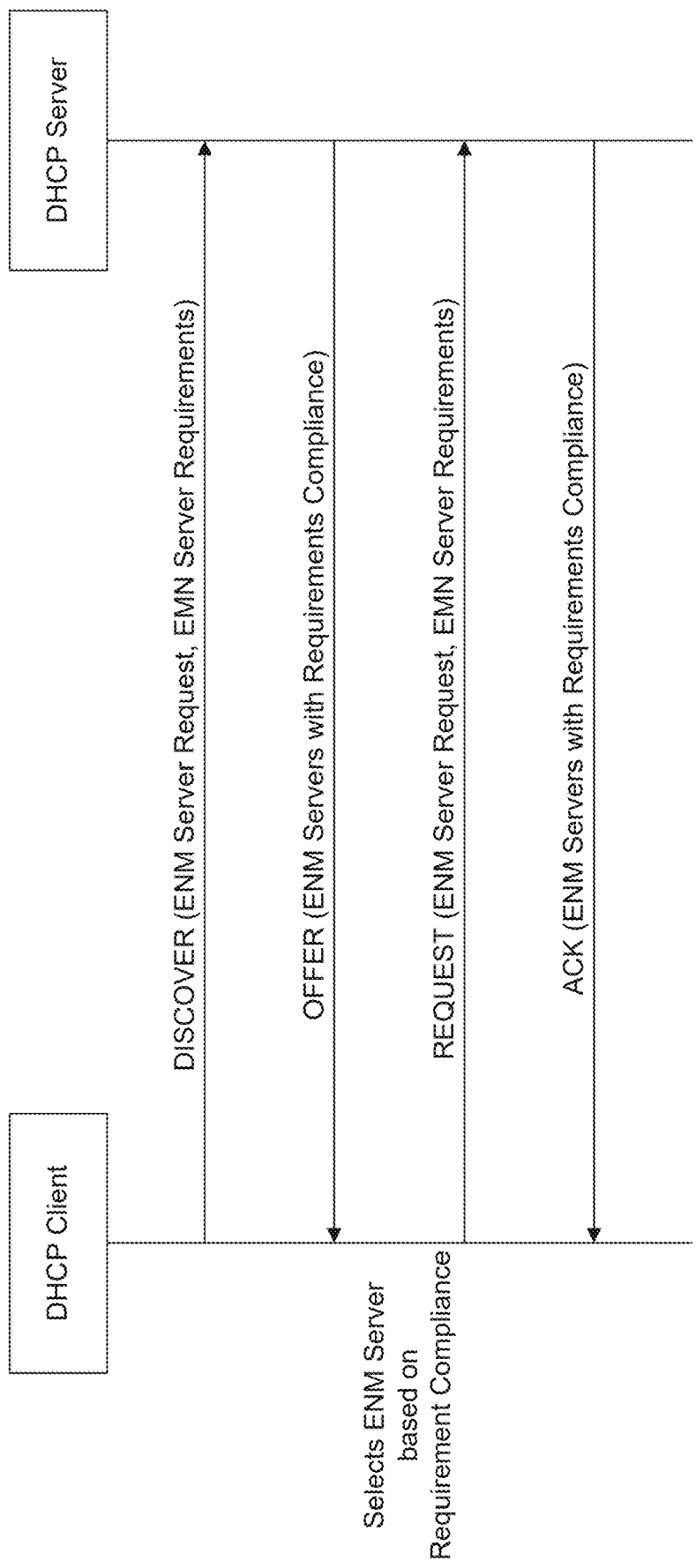
FIG. 7 is a diagram illustrating a client selecting an ENM server, according to embodiments.

FIG. 7 is a diagram illustrating a client selecting an ENM server, according to embodiments. According to embodiments, (e.g., referring to FIG. 7) a client may (e.g., be free to) choose (e.g., between) any of ENM servers, for example, regardless of the order in which they are listed. According to embodiments, in a case where a client receives more than one OFFER message in response to a DISCOVER message, the client may (e.g., also be free to) choose between those OFFERs based on any of ENM Servers, or any other criteria.

such as, but not limited to, any of requirements, capabilities, parameters, characteristics, measurements, configurations, resources, triggers, signals, and indicators associated with any of a client device (e.g., a WTRU), applications, services, network slices, ENM server instances, a network, a fog network, an edge network, a radio frequency network, a core network, a wired network, etc.

According to embodiments, for example, in the case of active device location tracking and augmented reality, a tourist may be walking through an area (e.g., new to them), with primary interests being to not get lost (e.g., navigate to a desired location) and learn about landmarks along the walking route. That is, the tourist may desire to have (e.g., enjoy) an enhanced experience using AR. In such a case, according to embodiments, feature dependencies may be such that "User Apps" and "Location" are requirements (e.g., must-haves), and "Smart Relocation" is optional (e.g., nice-to-have) for execution of (e.g., sending a discovery request associated with) an application (e.g., services executed by the tourists WTRU) for guidance (e.g., navigation) through and historical information (e.g., AR information) in an area (e.g., a new venue). In such a case, the tourists' primary interests to learn and not get lost may be satisfied.

According to embodiments, a format of a (e.g., new) ENM servers with requirements compliance DHCP option may be as follows:

```
This option specifies a list of I? addresses indicating ENM Servers
      available to the client. Servers SHOULD be listed in order of
                              preference.
   For each ENM Server, a bitmask indicates the availability of each
    ENM Server Requirement, in the order specified by the client in
                    the ENM Server Requirements Option.
     The code for this option is Z. The minimum length is 8 , and the
                      length MUST be a multiple of 8.

Code   Len           Address 1                      Mask 1
   +-----+-----+-----+-----+-----+-----+-----+-----+-----+-----+
   |  Z  |  n  | a1  | a2  | a3  | a4  | m1  | m2  | m3  | m4  |
   +-----+-----+-----+-----+-----+-----+-----+-----+-----+-----+
            Address 2                 Mask 2
   +-----+-----+-----+-----+-----+-----+-----+-----+-----
   | a1  | a2  | a3  | a4  | m1  | m2  | m3  | m4  | ...
   +-----+-----+-----+-----+-----+-----+-----+-----+-----
```

Client Rediscovering ENM Servers

Figure 8:
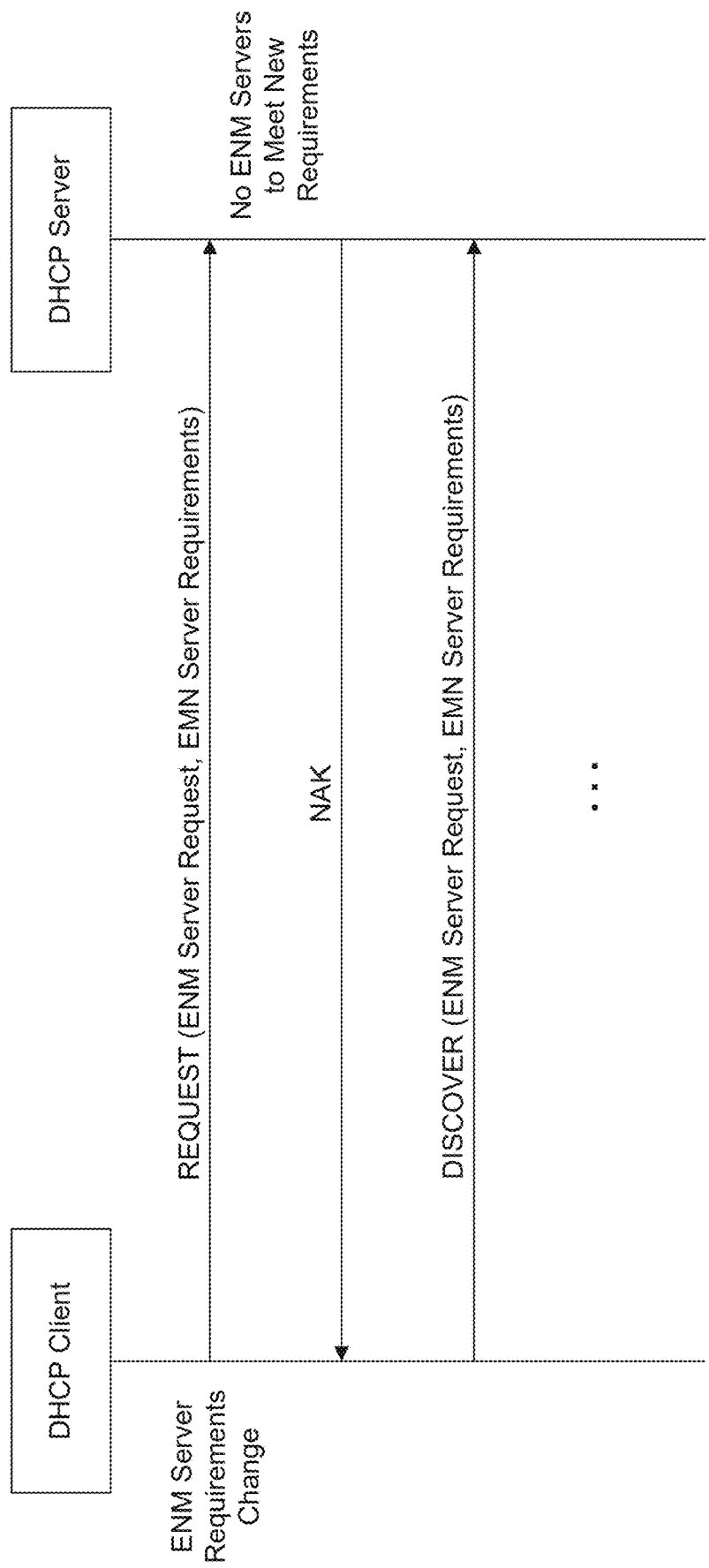
FIG. 8 is a diagram illustrating a client rediscovering ENM servers, according to embodiments.

FIG. 8 is a diagram illustrating a client rediscovering ENM servers, according to embodiments.

According to embodiments, in a case where a client's ENM server requirements change, for example, while associated with an edge network, that is, in the DHCP "Bound" state, the client may issue a DHCP REQUEST containing its new requirements, for example, as shown in FIG. 8. According to embodiments, a DHCP server may send (e.g., respond with) an ACK, for example, containing any of a list of ENM servers that meet the requirements or a list of ENM Servers with associated requirements compliance. According to embodiments, in a case where the DHCP server determines (e.g., decides) that no (e.g., satisfactory) ENM Servers are available, the DHCP server may (e.g., instead) send a NAK, for example, to trigger the client back to the "Init" state to send fresh DISCOVER messages. According to embodiments, in a case where a client's ENM server Requirements change while not using DHCP for IP address assignment, the client may issue a DHCP INFORM message, for example, containing the client's new requirements. According to embodiments, a DHCP server may send (e.g., responds with) an ACK, for example, containing any of a list of ENM servers that meet the requirements, or a list of ENM servers with associated requirements compliance. According to embodiments, in a case where a DHCP server determines (e.g., decides) that no (e.g., satisfactory) ENM servers are available, the DHCP server may (e.g., still) send an ACK, for example, with an empty ENM Server list.

DHCP Applicability to 3GPP

As discussed above, there may be a case, for example, that of a 3GPP SA6 architecture, having an Edge Enabler Server (EES) functioning as (e.g. operating as, performing operations of, etc.) an ENM Server. In such a case, for example, in order to facilitate discovery of an EES, an Edge Data Network Configuration Server (ECS) (e.g., of a 3GPP SA6 architecture) may be used. However, in such a case, use of an ECS may (e.g., simply, merely, etc.) add (e.g., further) complexity to/for discovery, or in other words, may add a layer to the problem of performing discovery. That is, in such a case of a ECS in a 3GPP SA6 architecture, there is a need to determine how the ECS is found. According to embodiments, in a case where an ECS (e.g., also) functions as an ENM server, there are methods, operations, features, etc., as discussed hereinbelow, for determining and/or finding a ECS. As referred to hereinbelow, the acronym EXS may be used interchangeably to refer to any of an EES or an ECS.

According to embodiments, for example, as discussed above, DHCP may be supported (e.g., a supported option) for local area data networks (LADNs). For example, a DHCP option and/or PDU Session PCO may be used (e.g., has been specified by 3GPP) for (e.g., as a means of/for) discovering addresses of local servers (e.g., of LADNs) in similar subsystems (e.g., P-CSCF for IMS). According to embodiments, for example in a case of DHCP in 3GPP, an EXS address may be added to (e.g. included in, provided in/by, indicated in/by, etc.) the PCO. That is, according to embodiments, in order to support WTRU discovery of EXS's (e.g., determining EXS addresses), regardless of (e.g., in a manner that is neutral to) a method used for WTRU address assignment and network configuration, the EXS addresses may (e.g., should) be added to the PCO.

According to embodiments, an SMF may (e.g., is able to, is configured to, etc.) obtain and/or provide (e.g., the necessary) information (e.g., an EXS address) used for and/or associated with discovery of an EXS. According to embodiments, for example, in a case of an operator-owned edge network, an EXS address may be obtained in a manner (e.g., using operations/procedures/features/etc., the same as, similar to, etc.) as that of obtaining a P-CSCF address. That is, according to embodiments, an EXS address may be obtained according to any of being locally configured in the SMF or being discovered using NRF. According to embodiments, in such a case of obtaining an EXS address, a WTRU may include a (e.g., new) indicator, for example, within a S1 SM Container, for example, to trigger the SMF to determine the address of the EXS. According to embodiments, in a case of a third-party edge network, an EXS address may be obtained using (e.g., via) a DHCP request to the local DHCP Server. According to embodiments, in such a case, third-party edge networks may be (e.g., remain) independent of the 3GPP system, and may seamlessly support 3GPP and non-3GPP WTRU's (e.g., alike, in a similar manner, etc.).

Figure 9:
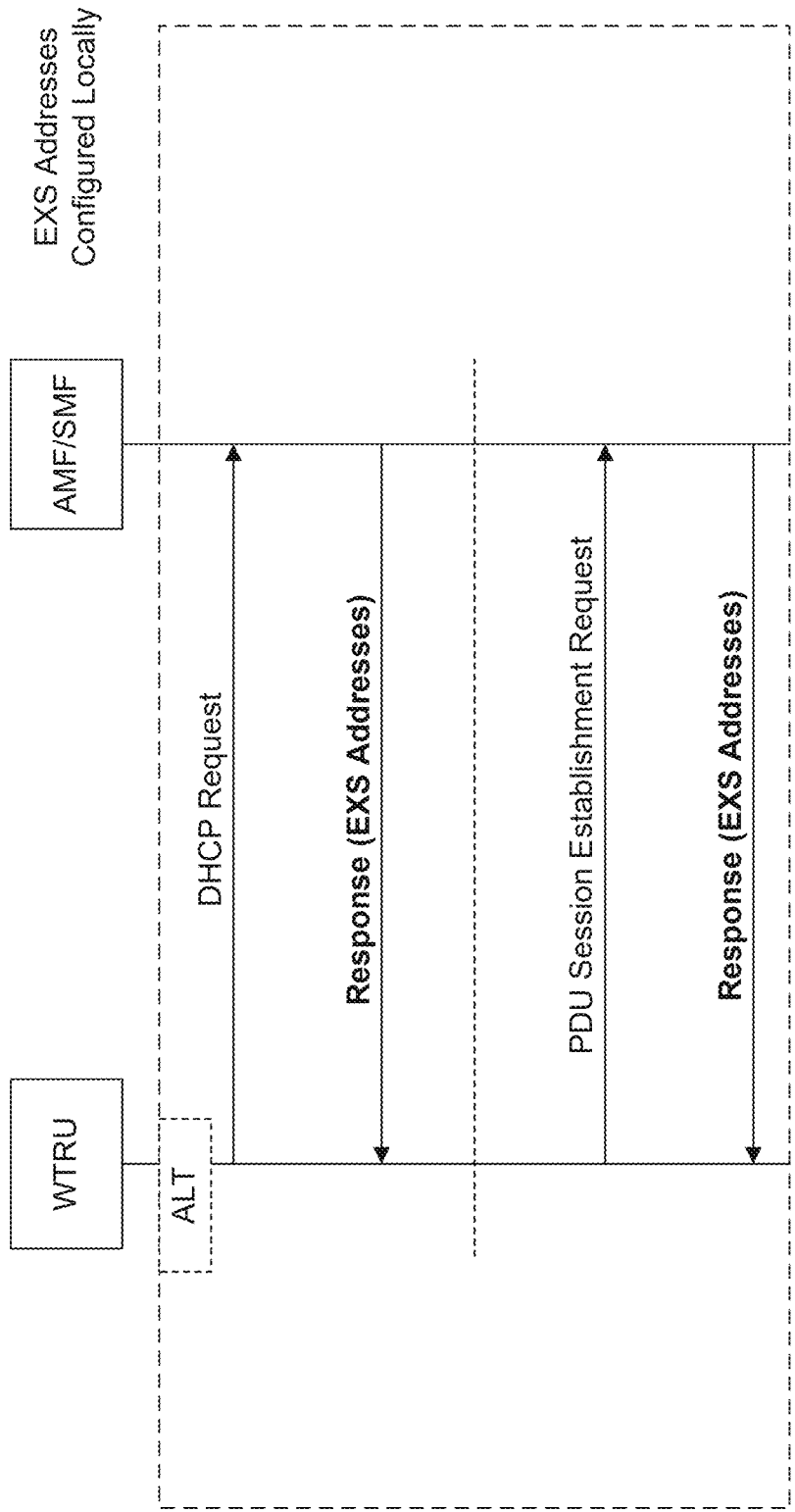
FIG. 9 is a diagram illustrating EXS discovery, according to embodiments.
Figure 10:
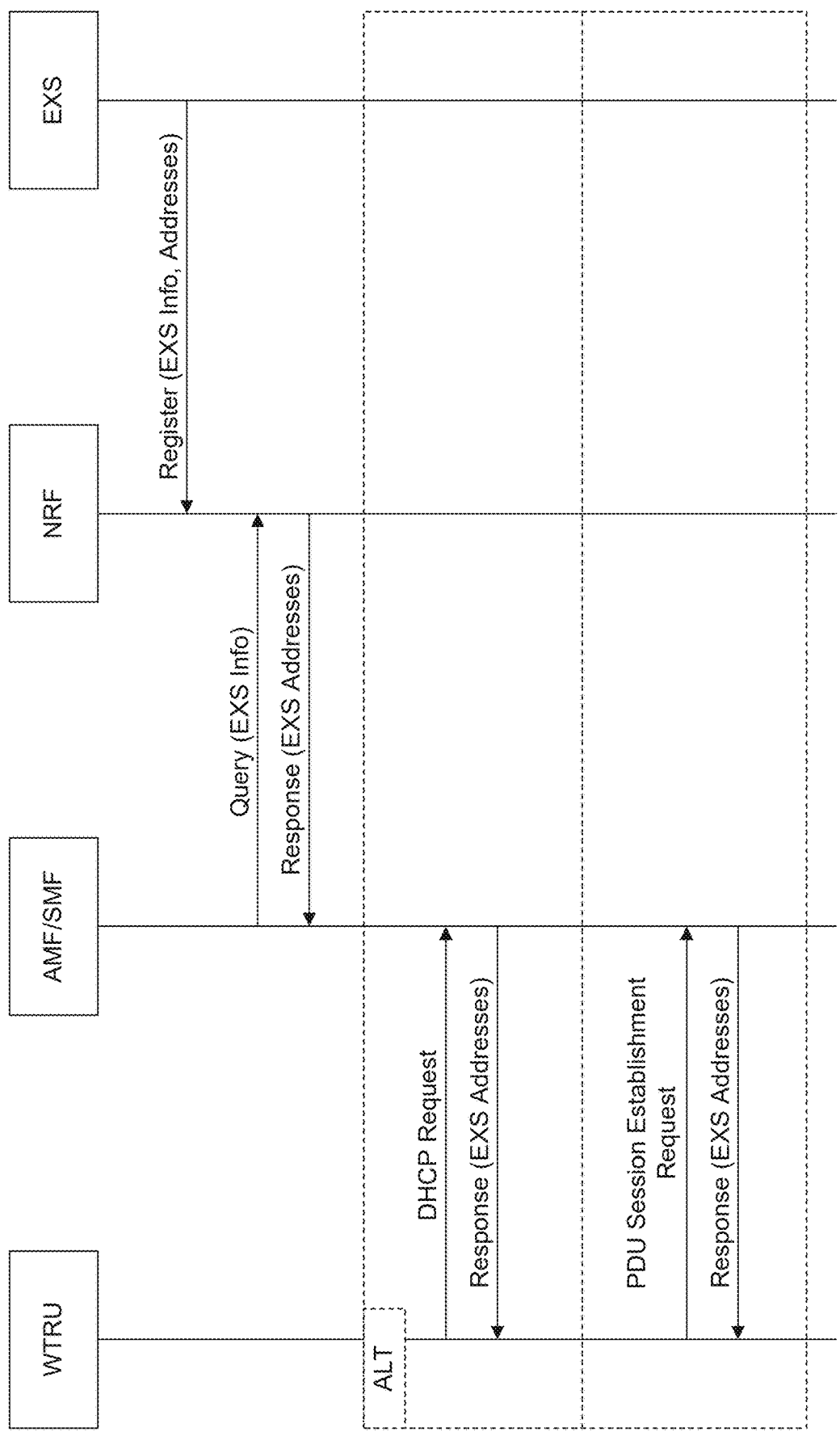
FIG. 10 is a diagram illustrating EXS discovery, according to embodiments.
Figure 11:
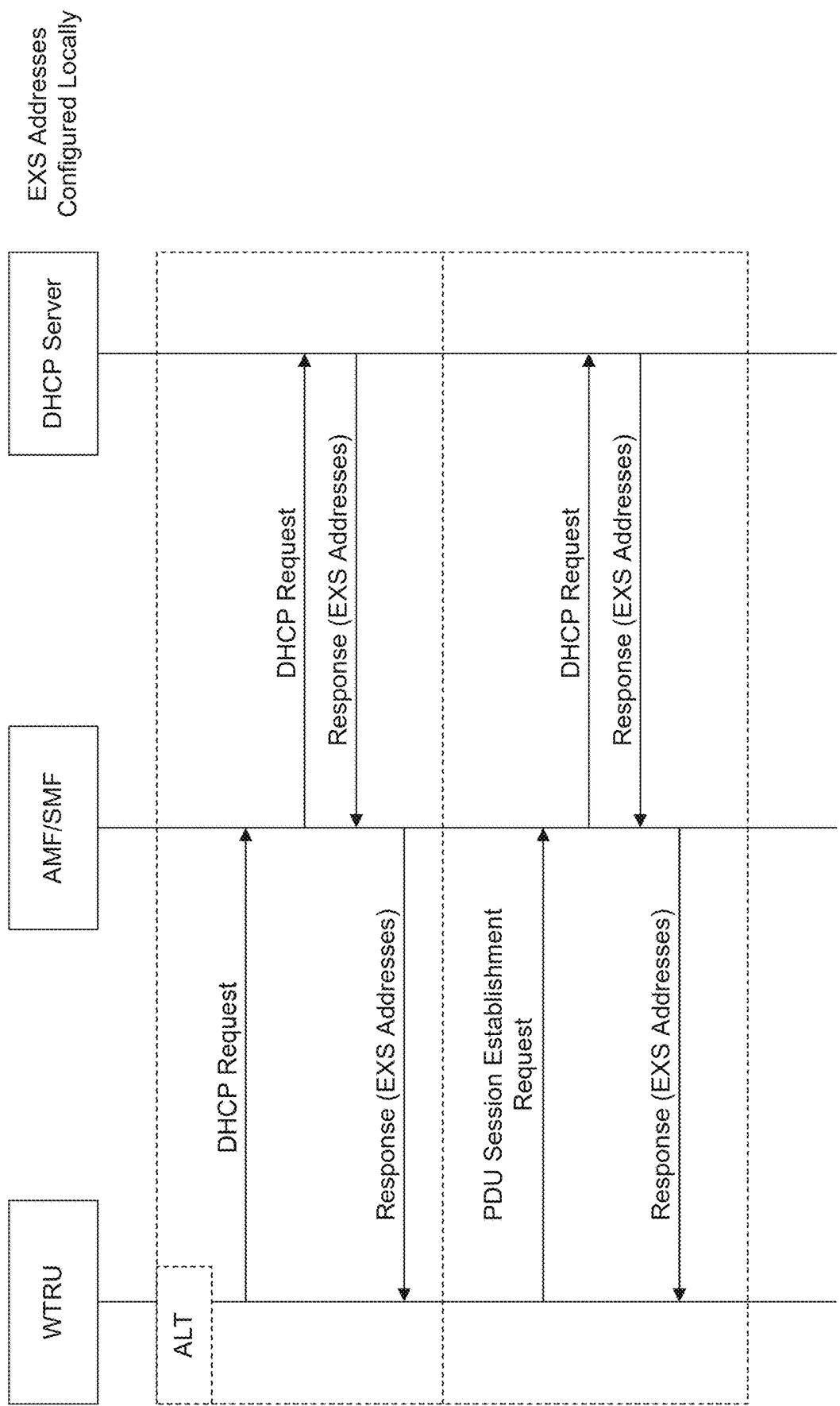
FIG. 11 is a diagram illustrating EXS discovery, according to embodiments.

FIG. 9, FIG. 10, and FIG. 11 are diagrams illustrating EXS discovery, according to embodiments. According to embodiments, for example, referring to FIG. 9, FIG. 10, and FIG. 11, there may be variations in procedures, for example, associated with ExsInfo. According to embodiments, any of an attribute name, and/or associated data type, a Presence (P) or Optional (O) value, cardinality, and/or description may be as provided (e.g., shown, etc.) in Table 1.

TABLE 1

| Attribute name | Data type | P | Cardinality | Description |
|---|---|---|---|---|
| smfServingArea | array(string) | O | 1 . . . N | The SMF service area(s) the EXS can serve. |
| upfinfolist | array(UpfInfo) | O | 1 . . . N | List of UPF in proximity or associated. |
| ladnInfo | LadnInfo | O | 0 . . . 1 | LADN service area, may include DNN name. |
| taiList | array(Tai) | O | 1 . . . N | List of TAIs the EXS can serve. May contain the non-3GPP access TAI. |
| geoLocation | string | O | 1 | Geo location of the EXS deployment. | for EXS discovery. According to embodiments, referring to FIG. 9, a (e.g., 3GPP) EXS address may be configured (e.g., stored locally) in a SMF. According to embodiments, for example, in a case of FIG. 9, a WTRU may obtain EXS addresses using any of DHCP messages and PDU session establishment messages. According to embodiments, referring to FIG. 10, an EXS may register with a NRF, and the SMF may query the NRF. According to embodiments, referring to FIG. 11, an EXS may be configured (e.g., stored) in a (e.g., local) DHCP Server.

According to embodiments, in a case of EXS discovery, for example, referring to any of FIG. 9, FIG. 10, and FIG. 11, there may be impacts on any of a WTRU and a SMF. According to embodiments, any of a WTRU and a SMF may request and/or provide EXS Addresses, for example, during PDU session establishment, for example, using a (e.g., new) PCO. According to embodiments, in a direction of a WTRU towards a network, there may be any of (e.g., a transmission of, information indicating, etc.) an EXS IPv4 address request, and an EXS IPv6 address request, which may be included in and/or associated with any suitable and/or yet to be determined (e.g., new) container identifier. According to embodiments, in a direction of a network towards a WTRU, there may be any of (e.g., a transmission of, information indicating, etc.) an EXS IPv4 address, and an EXS IPv6 address, which may be included in and/or associated with any suitable and/or yet to be determined (e.g., new) container identifier.

According to embodiments, a container identifier may indicate (e.g., include information indicating) an EXS address request. According to embodiments, in such a case, of the container identifier indicating an EXS address request, a container identifier contents field may be empty, and a length of the container identifier contents may indicate a length of (e.g., equal to) zero. According to embodiments, in a case where the container identifier contents field is not empty, it may (e.g., shall) be ignored. According to embodiments, a container identifier may indicate (e.g., include information indicating) an EXS address. For example, in such a case of the container identifier indicating an EXS address, a container identifier contents field may contain an (e.g., one) IP address corresponding to the EXS address to be used, according to embodiments. According to embodiments, in a case where there is a need to include more than one EXS address, more logical units with the container identifier indicating an EXS Address may be used.

According to embodiments, for example, for any of registering and/or discovery of an EXS, any of an EXS, an NRF, and an SMF, may use any of: a (e.g., new) NF Type, such as, for example, a NF Type associated with an EXS; and a (e.g., new) data type, such as, for example, a data type associated with ExsInfo. According to embodiments, any of an attribute name, and/or associated data type, a Presence (P) or Optional (O) value, cardinality, and/or description may be as provided (e.g., shown, etc.) in Table 1.

Support for Multiple EECs During ECS Provisioning

According to embodiments, there may be a case (e.g., as defined by 3GPP) having multiple edge enabler clients (EECs) may be associated with multiple application clients (ACs), and these EECs may be (e.g., even, also, etc.) associated with multiple PLMNs.

Figure 12:
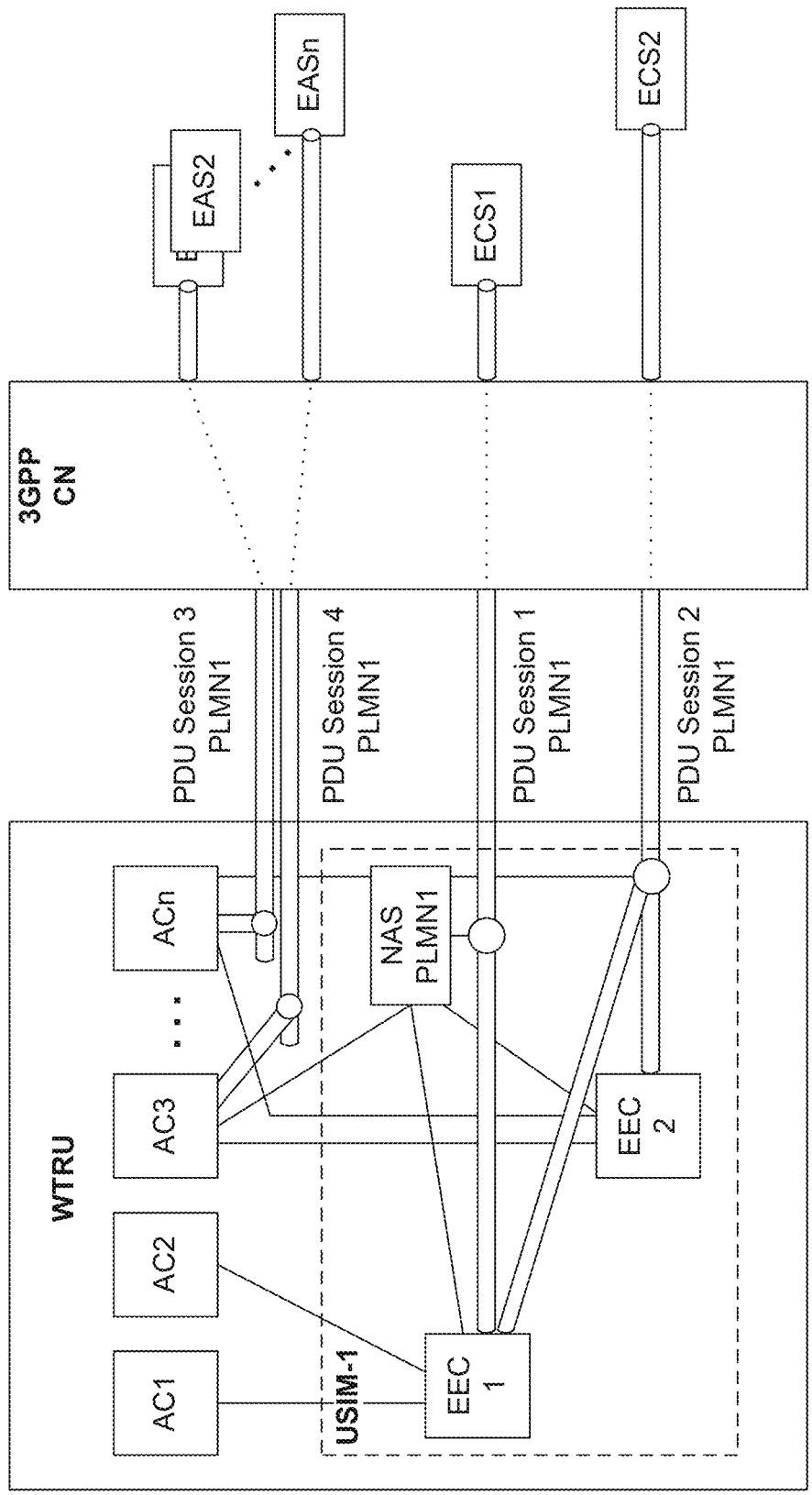
FIG. 12 is a diagram illustrating association of EECs and ACs according to cardinality, according to embodiments.

FIG. 12 is a diagram illustrating association of EECs and ACs according to cardinality, according to embodiments.

According to embodiments, ECS address information may be provisioned by a MNO, for example, through 5G core network procedures. According to embodiments, for example, referring to FIG. 12, there may be multiple EEGs, and these EEGs may serve one or more ACs. For example, EE1 may serve requests from AC1 and AC2, while EEC2 may serve requests from (e.g., takes care of) AC3 and ACn. According to embodiments, an EEC may be associated to one or multiple ECSs, and/or one ECS may be associated to one or multiple EEGs.

Figure 13:
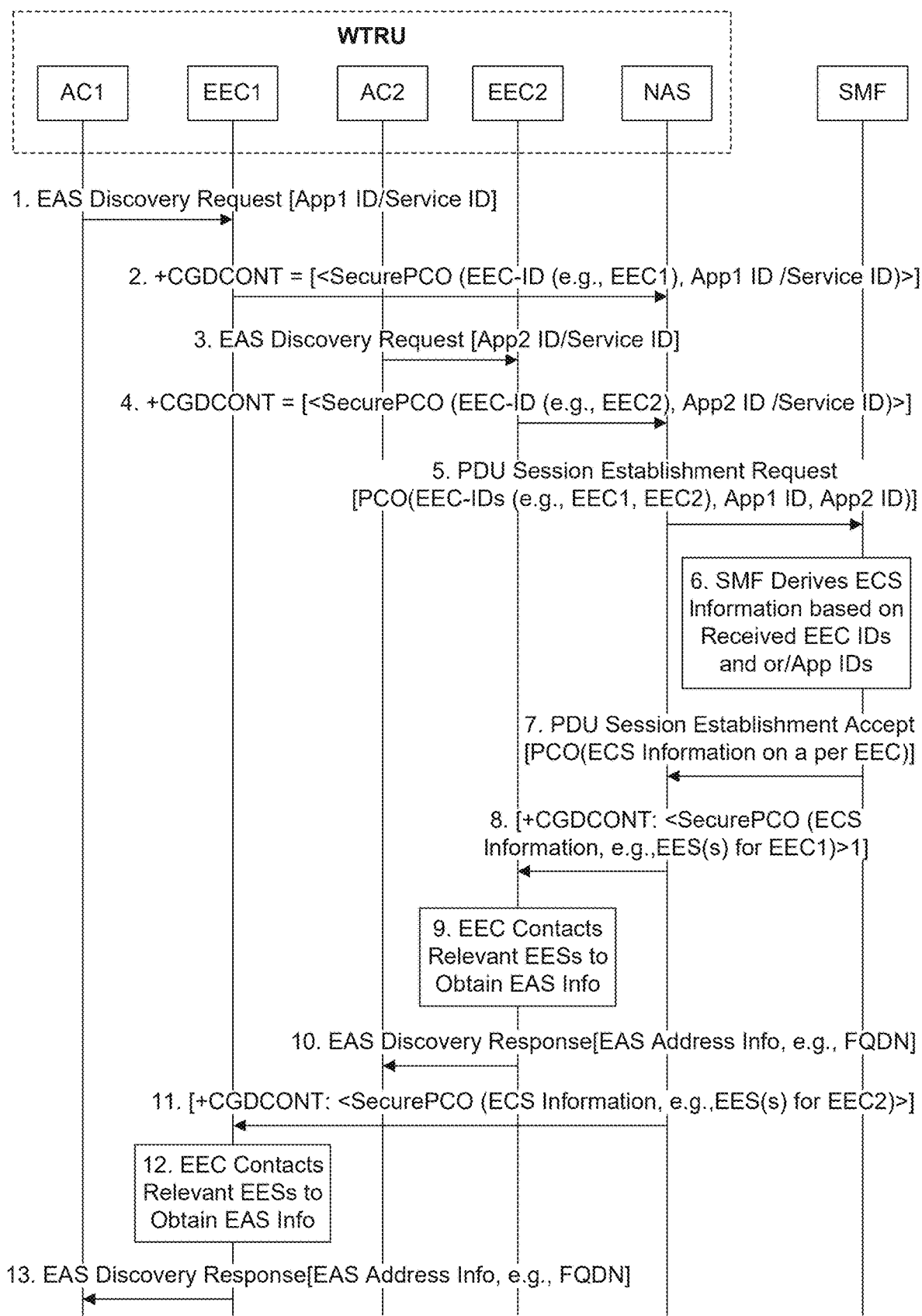
FIG. 13 is a diagram illustrating ECS provisioning, according to embodiments.

FIG. 13 is a diagram illustrating ECS provisioning, according to embodiments.

According to embodiments, an EEC may provide, for example, to a WTRU, information indicating any of (e.g., regarding any of the) available EECs and/or their IDs, and/or the App ID and/or services supported by these EECs. That is, for example, in a case of multiple EECs and/or multiple ACs, in addition to and/or in place of informing the SMF whether a WTRU supports the transfer of ECS configuration information between the NAS layer and the EEC, the EEC may provide the WTRU with information regarding the available EECs and/or their IDs or the application ID/services supported by these EECs. According to embodiments, for example, referring to FIG. 13, a network, for example (e.g., in particular), the SMF, may use such information to select applicable ECS information, for example, according to the EECs supported and/or configured in the WTRU.

According to embodiments, referring to FIG. 13, an ECS provisioning procedure may include any of the following operations. According to embodiments, as a first operation, an AC, for example, AC1, that may need to contact relevant EAS servers, may request EAS discovery through EDGE-4, and the AC may provide (e.g., as part of and/or included in the request) any of its application ID or service ID. According to embodiments, as a second operation, an EEC associated to AC1, for example, EEC1, may issue (e.g., send, transmit, provide, etc.) an AT command, for example, to trigger the establishment of a PDU Session. According to embodiments, the EEC (e.g., EEC1) may (e.g., also, additionally, etc.) provide its EEC ID (e.g., EEC1) and the App Id and/or Service ID provided by the relevant AC. According to embodiments, such information may be provided (e.g., sent), for example, in a PCO part of a +CGDCONT AT command.

According to embodiments, as a third operation, an AC, for example, AC2, may need to contact relevant EAS servers, for example, to request EAS Discovery through EDGE-4, and such an AC (e.g., AC2) may provide its application ID or Service ID, for example, to EAS servers. According to embodiments, as a fourth operation, an EEC associated to AC2, for example, EEC2, may send (e.g., transmit, issue, etc.) an AT command for triggering the establishment of a PDU Session, and the EEC may provide its EEC ID (e.g., EEC2) and/or any of the App Id and Service ID provided by the relevant AC. According to embodiments, such command and/or information may be sent in the PCO part of the +CGDCONT AT command. According to embodiments, as a fifth operation, a NAS layer (e.g., processor operations for and/or associated with a NAS layer) may be implemented, such that the NAS layer waits for more than one EEC request before issuing a PDU session establishment message, and may, thus, provide information for any of one or more EEGs and any of one or more ACs. According to embodiments, such requests may be from EECs associated to services provided within the same network slice, for example, as given by the S-NSSAI provided in the AT command.

According to embodiments, as a sixth operation, an SMF, for example, upon receipt of a PDU session establishment request message, may derive ECS information relevant to the EECs and/or app IDs provided in the PCO within (e.g., during) the PDU session establishment request message. According to embodiments, as a seventh operation, the SMF may provide the derived information, for example, per EEC, in a PDU session establishment accept message. According to embodiments, as an eighth operation, the NAS layer may relay the ECS information to the relevant EEC (e.g., EEC2). According to embodiments, as a ninth operation, the EEC may use the ECS information provided in the PCO, for example, to obtain the applicable EES address information. According to embodiments, in such a ninth operation, the EEC may use (e.g., go through) the EES to obtain applicable EAS information.

According to embodiments, as a tenth operation, the EEC may provide applicable EAS information to the relevant AC (e.g., AC2) in to EAS discovery response. According to embodiments, as an eleventh operation, the NAS layer may relay the ECS Information to the relevant EEC (e.g., EEC1). According to embodiments, as a twelfth operation, the EEC may use the ECS information, for example, as provided in the PCO, to obtain the applicable EES address information. According to embodiments, the EEC may use (e.g., go through) the EES for obtaining applicable EAS information. According to embodiments, as a thirteenth operation, the EEC may provide applicable EAS information to the relevant AC (e.g., AC1) in the EAS discovery response.

According to embodiments, in a case of ECS provisioning, for example, referring to any of FIG. 12 and FIG. 13, there may be impacts on any of a WTRU and a network. According to embodiments, in a case of a WTRU, there may be an EEC within the WTRU that may (e.g., needs to) provide any of its client ID, application ID, and service IDs, for example, from connected ACs using (e.g., through, via, etc.) a +CGDCONT AT command. According to embodiments, the NAS layer may (e.g., needs to) relay any of an EEC ID, an application ID, and a service ID, for example, in the PCO when issuing a PDU session establishment request message. According to embodiments, in a case of a WTRU, the EEC (e.g., within the WTRU) may (e.g., needs to) extract the ECS information provided in the PCO. According to embodiments, the WTRU may extract such for every AC, and the WTRU may determine whether one or more EES may be (e.g., needs to be) contacted, for example, to obtain relevant EAS Information.

According to embodiments, in a case of a network, a SMF may (e.g., needs to) extract any of the EEC IDs, application IDs, and service IDs, for example, in order to use them as an input to the derivation of relevant ECS information on a per EEC(s) basis. According to embodiments, in a case of a network, a SMF may (e.g., needs to) provide the ECS information, for example within the PCO in the PDU Session establishment accept message, for example, for every EECs. According to embodiments, in such a case, optimizations may be possible in a case where all EECs are associated with/to the same ECS.

CONCLUSION

The contents of the following are each incorporated by reference herein: (1) 3GPP TR 23.758 V2.0.0 (2019 December); (2) 3GPP TS 23.501 V16.3.0 (2019 December); (3) 3GPP TS 29.561 V16.2.0 (2019 December); (4) 3GPP TS 24.501 V16.3.0 (2019 December); (5) 3GPP TS 24.008 V16.3.0 (2019-12); (6) ETSI MEC website: https://www.etsi.org/technologies/multi-access-edge-computing, (7) ETSI GS MEC 003 V2.1.1 (2019 January); (8) ETSI GS MEC 002 V2.1.1 (2018-10); and (9) IDCC Disclosure 2019ID00437, Methods for Edge Resolution Function in mobile devices & 5G edge-networks.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a UE, WTRU, terminal, base station, RNC, or any host computer.

Moreover, in the embodiments described above, processing platforms, computing systems, controllers, and other devices including the constraint server and the rendezvous point/server containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed".

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs), Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments (e.g., only) and is not intended to be limiting. As used herein, when referred to herein, the terms "user equipment" and its abbreviation "UE" may mean (1) a wireless transmit and/or receive unit (WTRU), such as described infra; (2) any of a number of embodiments of a WTRU, such as described infra; (3) a wireless-capable and/or wired-capable (e.g., tetherable) device configured with, inter alia, some or all structures and functionality of a WTRU, such as described infra; (4) a wireless-capable and/or wired-capable device configured with less than all structures and functionality of a WTRU, such as described infra; or (5) the like. Details of an example WTRU, which may be representative of any WTRU recited herein.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method, performed by a wireless transmit/receive unit (WTRU), for discovery of an available Edge Data Network Configuration Server (ECS) associated with an Edge Enabler Server (EES), the method comprising:
   sending a protocol data unit (PDU) session establishment request message to a core network entity, wherein the PDU session establishment request message comprises a first Protocol Configuration Option (PCO), and wherein the first PCO comprises information related to receiving ECS addresses;
   receiving a PDU session establishment accept message from the core network entity in response to the PDU session establishment request message, wherein the PDU session establishment accept message comprises a second PCO, and wherein the second PCO comprises ECS information, the ECS information comprised in the second PCO comprising an ECS address, an identifier, and a list of tracking area identities (TAIs) that can be served by an ECS associated with the ECS information;
   providing at least the ECS address from a Non-Access Stratum (NAS) layer of the WTRU to an edge enabler client (EEC) of the WTRU; and
   performing communications with one or more ECSs.

2. The method of claim 1, wherein the core network entity comprises a session management function (SMF).

3. The method of claim 1, wherein the first PCO comprises an edge enabler clients (EEC) identification (ID) and one or more of an application ID or a service ID.

4. The method of claim 1, further comprising:
   obtaining, by the EEC of the WTRU, EES address information based on the ECS information.

5. The method of claim 1, wherein the ECS address comprises an internet protocol (IP) Address.

6. The method of claim 1, wherein an attention (AT) Command is used to send the ECS information from the Non-Access Stratum (NAS) layer of the WTRU to the EEC of the WTRU.

7. The method of claim 4, further comprising:
   obtaining, by the EEC of the WTRU, edge application server (EAS) address information based on the EES information.

8. The method of claim 7, further comprising:
   sending, via an application client (AC) of the WTRU, an EAS discovery request to the EEC, wherein the EAS discovery request comprises an application ID or a service ID.

9. A method, performed by a session management function (SMF), for enabling discovery of an available Edge Data Network Configuration Server (ECS) associated with an Edge Enabler Server (EES), the method comprising:
   receiving a protocol data unit (PDU) session establishment request message from a wireless transmit/receive unit (WTRU), wherein the PDU session establishment request message comprises a first Protocol Configuration Option (PCO), and wherein the first PCO comprises information related to receiving ECS addresses;
   determining ECS information based on the PDU session establishment request message; and
   sending a PDU session establishment accept message to the WTRU in response to the PDU session establishment request message, wherein the PDU session establishment accept message comprises a second PCO, and wherein the second PCO comprises ECS information, the ECS information comprised in the second PCO comprising an ECS address, an identifier, and a list of tracking area identities (TAIs) that can be served by an ECS associated with the ECS information.

10. The method of claim 9, wherein the ECS address comprises an internet protocol (IP) Address.

11. The method of claim 9, further comprising:
    receiving, from an application client (AC) of the WTRU, an EAS discovery request, wherein the EAS discovery request comprises an application ID or a service ID.

12. The method of claim 9, wherein the ECS information is received by the SMF from a network repository function (NRF).

13. A wireless transmit/receive unit (WTRU) comprising:
    a processor and memory, wherein the processor and memory are configured to:
    send a protocol data unit (PDU) session establishment request message to a core network entity, wherein the PDU session establishment request message comprises a first Protocol Configuration Option (PCO), and wherein the first PCO comprises information related to receiving Edge Data Network Configuration Server (ECS) addresses;
    receive a PDU session establishment accept message from the core network entity in response to the PDU session establishment request message, wherein the PDU session establishment accept message comprises a second PCO, and wherein the second PCO comprises ECS information, the ECS information comprised in the second PCO comprising an ECS address, an identifier, and a list of tracking area identities (TAIs) that can be served by an ECS associated with the ECS information;
    provide at least the ECS address from a Non-Access Stratum (NAS) layer of the WTRU to an edge enabler client (EEC) of the WTRU; and
    perform communications with one or more ECSs.

14. The WTRU of claim 13, wherein the ECS address comprises an IP Address.

15. The WTRU of claim 13, wherein the processor and memory are configured to use an attention (AT) Command to send the ECS information from the Non-Access Stratum (NAS) layer of the WTRU to the EEC of the WTRU.

16. The WTRU of claim 13, wherein the processor and memory are configured to:
    obtain, by the EEC of the WTRU, edge application server (EAS) address information based on the EES information; and
    send, via an application client (AC) of the WTRU, an EAS discovery request to the EEC, wherein the EAS discovery request comprises an application ID or a service ID.

* * * * *